US012410639B2

(12) United States Patent
Štekl et al.

(10) Patent No.: US 12,410,639 B2
(45) Date of Patent: Sep. 9, 2025

(54) LOCK ARRANGEMENT, IN PARTICULAR FOR AN ENGINE HOOD OF A VEHICLE

(71) Applicant: Witte Automotive GmbH, Velbert (DE)

(72) Inventors: Vladimir Štekl, Bolevec (CZ); Milan Fišer, Manetin (CZ); Josef Velek, Chyše (CZ); Jan Lášek, Plzen (CZ)

(73) Assignee: Witte Automotive GmbH, Velbert (DE)

(*) Notice: Subject to any disclaimer, the term of this patent is extended or adjusted under 35 U.S.C. 154(b) by 151 days.

(21) Appl. No.: 18/165,370

(22) Filed: Feb. 7, 2023

(65) Prior Publication Data

US 2023/0250679 A1 Aug. 10, 2023

(30) Foreign Application Priority Data

Feb. 7, 2022 (DE) ..................... 10 2022 201 252.6

(51) Int. Cl.
*E05B 81/42* (2014.01)
*E05B 81/06* (2014.01)
(Continued)

(52) U.S. Cl.
CPC .............. *E05B 81/42* (2013.01); *E05B 81/06* (2013.01); *E05B 81/16* (2013.01); *E05B 81/34* (2013.01); *E05B 83/243* (2013.01)

(58) Field of Classification Search
CPC ................... E05B 83/24; E05B 83/243; E05B 2047/0007; E05B 2047/0008;
(Continued)

(56) References Cited

U.S. PATENT DOCUMENTS 9,777,516 B2 * 10/2017 Farooq .................... E05B 81/64
10,717,407 B2 * 7/2020 Szente .................. E05B 51/023
(Continued)

FOREIGN PATENT DOCUMENTS

DE 3247018 A1 6/1984
DE 9413062 U1 12/1994
(Continued)

OTHER PUBLICATIONS

Machine generated translation of DE 102018214355 A1, generated Aug. 15, 2024. (Year: 2024).*

*Primary Examiner* — Kristina R Fulton
*Assistant Examiner* — Emily G. Brown
(74) *Attorney, Agent, or Firm* — Marshall & Melhorn, LLC

(57) ABSTRACT

A lock arrangement for an engine hood or a tailgate of a vehicle may have a locking element, a rotary catch for the locking element, a security element for securing the locking element in a secured position of the lock arrangement, a cam for unlocking and locking, and at least one actuating drive. The rotary catch and the locking element are coupled in locking fashion in a closed position of the lock arrangement. The at least one actuating drive may be designed as a two-way actuating drive which interacts with the cam. The cam is formed in such a way that, during the first actuation of the actuating drive, both in one step and in separate steps and in different sequences, the cam unlocks the rotary catch and locks the security element, or conversely the cam locks the security element and unlocks the rotary catch.

11 Claims, 20 Drawing Sheets

(51) Int. Cl.
*E05B 81/16* (2014.01)
*E05B 81/34* (2014.01)
*E05B 83/24* (2014.01)

(58) Field of Classification Search
CPC ..... E05B 2047/0013; E05B 2047/0036; E05B 81/06; E05B 81/16; E05B 81/34; E05B 81/42
See application file for complete search history.

(56) References Cited

U.S. PATENT DOCUMENTS

| | | | | |
|---|---|---|---|---|
| 2009/0236865 | A1* | 9/2009 | Dziurdzia | E05B 17/0029 292/226 |
| 2019/0055758 | A1* | 2/2019 | Chevalier | E05B 81/14 |
| 2019/0218833 | A1* | 7/2019 | Nelsen | E05B 83/24 |
| 2020/0141161 | A1* | 5/2020 | Nelsen | E05B 79/04 |
| 2020/0318400 | A1* | 10/2020 | Johann | E05B 81/14 |
| 2020/0399936 | A1* | 12/2020 | Bartola | E05B 79/20 |
| 2021/0172211 | A1* | 6/2021 | Rosales | E05B 81/64 |
| 2022/0228404 | A1* | 7/2022 | Klein | E05B 77/08 |
| 2022/0364397 | A1* | 11/2022 | Drost | E05B 83/26 |
| 2023/0160240 | A1* | 5/2023 | Kim | E05B 79/20 296/193.11 |

FOREIGN PATENT DOCUMENTS

| | | | | |
|---|---|---|---|---|
| DE | 19739977 | A1 | 3/1999 | |
| DE | 102007003292 | A1 | 7/2008 | |
| DE | 102017001559 | A1 | 8/2017 | |
| DE | 102017101997 | A1 | 8/2018 | |
| DE | 102018214355 | A1 * | 2/2020 | E05B 77/14 |
| FR | 2594876 | A1 | 8/1987 | |
| WO | WO-2018192609 | A1 * | 10/2018 | E05B 81/14 |

* cited by examiner

LOCK ARRANGEMENT, IN PARTICULAR FOR AN ENGINE HOOD OF A VEHICLE

FIELD

The invention relates to a lock arrangement, in particular for an engine hood or a tailgate of a vehicle.

BACKGROUND

A lock arrangement of the type mentioned at the outset, for example known from DE 197 39 977 A1, is used, for example, in motor vehicles for locking engine hoods, backrests, doors, hoods, tailgates, luggage compartment lids or the like. To unlock the lock arrangement, a locking mechanism formed from a blocking pawl, a rotary catch and a locking element is moved by means of an actuating drive, for example a servomotor, or manually in order to adjust the pawl from a locked position to an unlocked position. In the unlocked position of the blocking pawl, the rotary catch is released so that it can be opened from a closed position into an open position and so that the locking element, for example a locking retainer, is released.

The problem addressed by the invention is to specify an improved lock arrangement which can be constructed in a simple manner and can be reliably opened and easily installed.

The problem is solved according to the invention by a lock arrangement having the features of the claims.

The dependent claims relate to advantageous embodiments of the invention.

SUMMARY

The problem is solved according to the invention by a lock arrangement, in particular for an engine hood or a tailgate of a vehicle, wherein the lock arrangement comprises at least one locking element and a rotary catch for the locking element, wherein the rotary catch and the locking element are coupled in closed fashion in a closed position of the lock arrangement. Furthermore, the lock arrangement comprises a security element for securing the locking element in a secured position of the lock arrangement, a cam for unlocking and locking, and at least one actuating drive which is designed as a two-way actuating drive and which interacts with the cam, wherein the cam is designed such that, when the actuating drive is first actuated, both in one step and in separate steps and in different sequences, the cam unlocks the rotary catch and locks the security element, or conversely the cam locks security element and unlocks the rotary catch.

The advantages achieved with the invention consist in particular in that, by means of the additional cam, several variants are made possible in the temporal sequence of the unlocking and/or locking of the rotary catch and the security element.

For example, when the lock arrangement is closed, the rotary catch can simultaneously be unlocked and the security element can be locked during a first actuation of the actuating drive by means of the cam. Alternatively, the catch can first be unlocked by means of the cam during the first actuation of the actuating drive and the security element can then be locked. In a further alternative, the cam can lock the security element and unlock the rotary catch in one step or in separate steps.

In a simple embodiment, the cam can have two surfaces with different cam contours. The cam can have, for example, a first surface and a second surface, each of which is designed as a locking surface and/or an opening surface. The opening surface, for example upon the first actuation, engages directly or indirectly with the rotary catch for unlocking and opening the rotary catch, for example by means of a detent arm (also called a pawl). The locking surface passes for example directly into engagement with the security element, in order to lock it, or out of engagement in order to unlock it.

In addition, the actuating drive and/or the cam can be actuated in a first actuation direction during the first actuation and can be actuated during a second actuation in an actuation direction opposite the first actuation direction.

In one possible embodiment, during the second actuation of the actuating drive, the cam releases the security element (unlocks it) and opens the security element. As a result, the locking element can pass into an open position of the lock arrangement.

During the first actuation of the actuating drive, the cam releases the rotary catch, wherein the rotary catch automatically passes from a locked position into a free position and releases the locking element. The locking element passes into the secured position, in which the security element secures or locks the locking element. This ensures that, despite the open rotary catch, the lock arrangement does not open or completely open, since the locking element is held in the secured position by means of the safety element, for example a safety hook.

For example, the rotary catch comprises a spring element, in particular a return spring. For example, the rotary catch is held spring-loaded in the position locking the locking element (locked position of the rotary catch) by means of the spring element and the locking mechanism. If the rotary catch is unlocked, the spring element automatically sets the rotary catch into a position releasing the locking element so that this locking element is unlocked and is released from the rotary catch, but can still be placed in a position secured by the security element and held there.

During the second actuation of the actuating drive, the cam releases the safety element. The security element releases the locking element. The locking element passes into the open position of the lock arrangement. Thus, the locking element can move into an open position of the lock arrangement, in particular automatically, for example in a spring-assisted or hydraulically supported manner. In particular, the movable element of the vehicle, such as an engine hood, is automatically placed into an opening position with the locking element, such as a locking retainer.

In addition, the security element can comprise a spring element, in particular a return spring. For example, the security element is held in a position securing the locking element (secured position of the locking element) by means of the spring element and locked by means of the cam. If the security element is actuated by means of the cam and the security element is placed into a position that secures or releases the locking element, the spring element is tensioned. When the lock arrangement is closed, the locking element automatically closes by means of the spring element and is placed or brought, in particular pivoted, into the position securing the locking element or into the secured position. For example, the spring element is formed as a tension spring or compression spring.

Another aspect provides a locking mechanism for locking the rotary catch in the closed position of the lock arrangement. For example, the locking mechanism is designed as a pawl. The actuating drive is movement-coupled to the locking mechanism for unlocking or locking the rotary catch.

The actuating drive is designed as a servomotor which interacts with a spindle drive. The spindle drive is in particular a spindle with a thread or a tooth profile (also called a threaded spindle) which is driven by the servomotor. A transmission, in particular a gear transmission, engages in the thread. The gear mechanism is, for example, a toothed wheel with an external toothing or a disk or wheel segment with an external toothing which engages in the thread and rolls on it. In this case, the transmission is moved between two end positions when the servomotor is actuated by means of the spindle.

The actuating drive is designed as a two-way actuating drive. During the first actuation and the second actuation, the actuating drive actuates the cam and drives it. In addition, during the first movement, the actuating drive can actuate the locking mechanism, in particular the pawl, directly or indirectly via the cam in order to unlock the rotary catch. Furthermore, the movement of the actuating drive in the particular actuation direction can be limited by an end stop.

For the secured unlocking of the rotary catch and release and opening of the rotary catch and for simultaneous or sequential locking of the security element, the actuating drive is actuated in a first actuation direction, for example in the clockwise direction, and is operated for subsequent release or opening of the security element in a second actuation direction opposite the first direction, for example counter-clockwise. Thus, the lock arrangement can be opened and thus secured in steps by means of a single actuating drive.

Furthermore, the actuating drive, in particular the cam coupled thereto or a cam contour of the cam, can carry out further functions. The cam and/or its cam contour are or is configured in such a way and coupled, for example to the actuating drive, such that this cam or this cam contour is actuated by the actuating drive during the first and/or second actuation of the actuating drive. In this case, the cam, in particular its cam contour, can engage with the locking mechanism, in particular the blocking pawl, and/or the rotary catch and/or the security element. The cam, in particular its cam contour, can actuate the locking mechanism, the rotary catch and/or the security element directly or indirectly, for example during the first actuation so that the rotary catch is unlocked and the security element is blocked, or vice versa. This can take place simultaneously in a single step or sequentially in separate steps. During the second actuation, in particular inverse actuation, of the actuating drive, the cam, in particular the cam contour thereof, comes into engagement with the security element and actuates the latter so that the locking element is released and can be placed into the open position.

In addition, the actuating drive can interact with a mechanism for a reliable multi-step opening or closing of the lock arrangement. Such a mechanism is described, for example, in DE 10 2018 214 355 A1.

A further aspect of the invention provides that the lock arrangement comprises a locking module which has at least the locking element, the rotary catch, the security element, the cam, and the locking mechanism for locking the rotary catch in the closed position of the lock arrangement, and a drive module which comprises the at least one actuating drive, which is designed as a two-way actuating drive, wherein the locking module and the drive module are each preassembled and are subsequently coupled to one another.

Alternatively, the drive module can comprise two actuating drives which are each designed as two-way actuating drives and each drive a cam. A first actuating drive is provided for example for unlocking and locking the security element. A second actuating drive is provided for example for opening and closing the rotary catch. The two actuating drives can be operated synchronously or asynchronously.

For example, the elements or components of the locking module are arranged and fastened on a carrier element, in particular a carrier plate, wherein the components of the locking module are mounted in mechanically coupled fashion on the carrier element. The drive module comprises a holding element, in particular a holding plate, on which the components of the drive module are arranged and mounted in mechanically coupled fashion. The locking module and the drive module are held together by means of fastening elements, in particular fastening rivets or fastening bolts.

The invention makes it possible in a simple manner to form a compact and modular structure of the, in particular electrically actuatable, lock arrangement, which is formed from the two modules-a locking module and a drive module. The lock arrangement is variable in the actuation by means of the separate cam and allows several variants in the temporal sequence of the unlocking and/or locking of the rotary catch and security element.

A further embodiment provides for two actuating drives instead of one actuating drive. Such a configuration of the lock arrangement with two actuating drives for actuating the rotary catch and the security element allows further variants in the temporal sequence of the unlocking and/or locking of rotary catch and security element.

DESCRIPTION OF THE FIGURES

Embodiments of the invention are explained in greater detail with reference to the drawings. In the figures.

DETAILED DESCRIPTION

Parts corresponding to one another are provided with the same reference signs in all the drawings.

Figure 1:
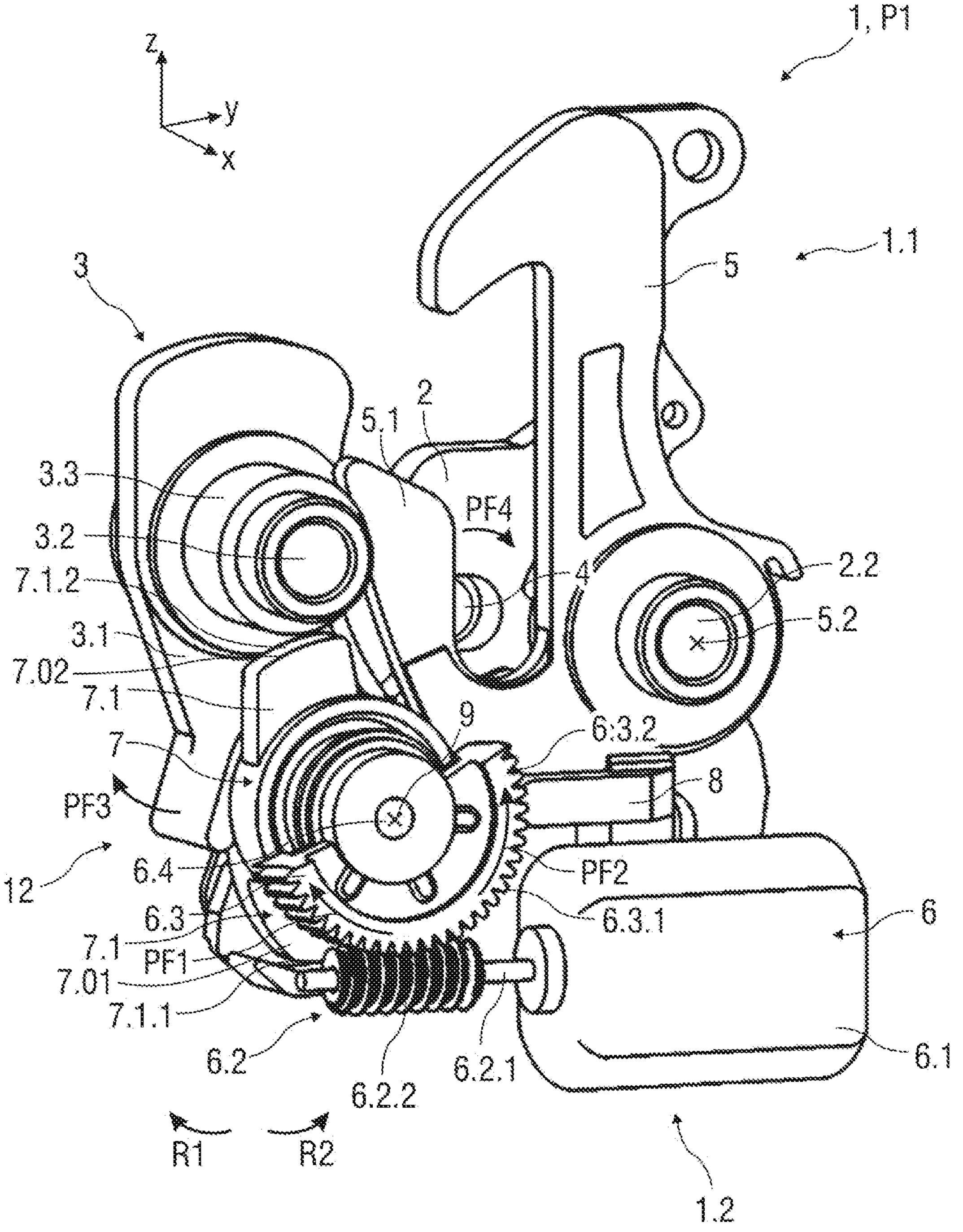
FIG. 1 shows a schematic perspective view of a first embodiment of a lock arrangement with an actuating drive, wherein the lock arrangement is shown in a closed position (locked and closed) and before a simultaneous unlocking of the rotary catch and locking of the safety element for the locking element.

FIG. 1 schematically shows a perspective view of a first exemplary embodiment of a lock arrangement 1 for, for example, an engine hood of a vehicle and before a simultaneous unlocking of a locking module 1.1 of the lock arrangement 1, in particular a preassembled locking module, and locking of a security element 5.

The lock arrangement 1 is formed in particular from the preassembled locking module 1.1 and a preassembled drive module 1.2, which are mechanically coupled and connected to one another. The lock arrangement 1 is formed electric, in particular having an electric motor. As an alternative to the electric-motor-driven opening and closing of the lock arrangement 1, this can also be opened and closed by means of an electrically actuatable hydraulic system, wherein this hydraulic system, not shown in greater detail, interacts for a stepped, in particular one-step or multi-step, opening or closing of the lock arrangement 1 with a mechanism 12 described below, in particular an unlocking mechanism and locking mechanism, as is described here for cooperation with an actuating drive 6.

The locking module 1.1 comprises at least one rotary catch 2, a locking mechanism 3 for locking the rotary catch 2 in a closed position P1 of the lock arrangement 1, a locking element 4 and the security element 5. The closed position P1 is also referred to as an initial position.

In the closed position P1 (closed state of the lock arrangement 1), the rotary catch 2 and the locking element 4 are coupled in closing fashion. The rotary catch 2 and the security element 5 are locked here against unlocking by means of the locking mechanism 3. For example, the rotary catch 2 and the security element 5 are connected to an outer contour of the locking mechanism 3 in a releasable force-fit connection, in particular a frictional connection. The rotary catch 2 is in a releasable force-fit connection here with an outer contour of a pawl 3.1 of the locking mechanism 3. The security element 5, in particular an outer contour of a claw-shaped hook 5.1 is, for example, in a releasable force-fit connection with an outer contour of an extension 3.3 protruding from the pawl 3.1.

The drive module 1.2 comprises a single actuating drive 6, which is designed, for example, as a two-way actuating drive, and the cam 7. The actuating drive 6 comprises, for example, a servomotor 6.1 which is coupled on the output side to a spindle drive 6.2. The spindle drive 6.2 comprises a spindle 6.2.1 with a thread 6.2.2.

The locking module 1.1 and the drive module 1.2 are each preassembled. In the preassembled state, these are coupled to one another and form the lock arrangement 1. For example, the above-described elements or components of the locking module 1.1 can be arranged and fastened on a carrier element, in particular a carrier plate, wherein the components of the locking module 1.1 can be mounted, mechanically coupled to one another, on the carrier element.

The drive module 1.2 can comprise a holding element, in particular a holding plate, on which the components of the drive module 1.2 can be arranged and mounted mechanically coupled to one another. The locking module 1.1 and the drive module 1.2 are held together by means of fastening elements, in particular fastening rivets or fastening bolts.

In the figures, the locking module 1.1 and the drive module 1.2 without its carrier element or holding element are shown for better clarity of the functions of the lock arrangement 1.

Figure 2:
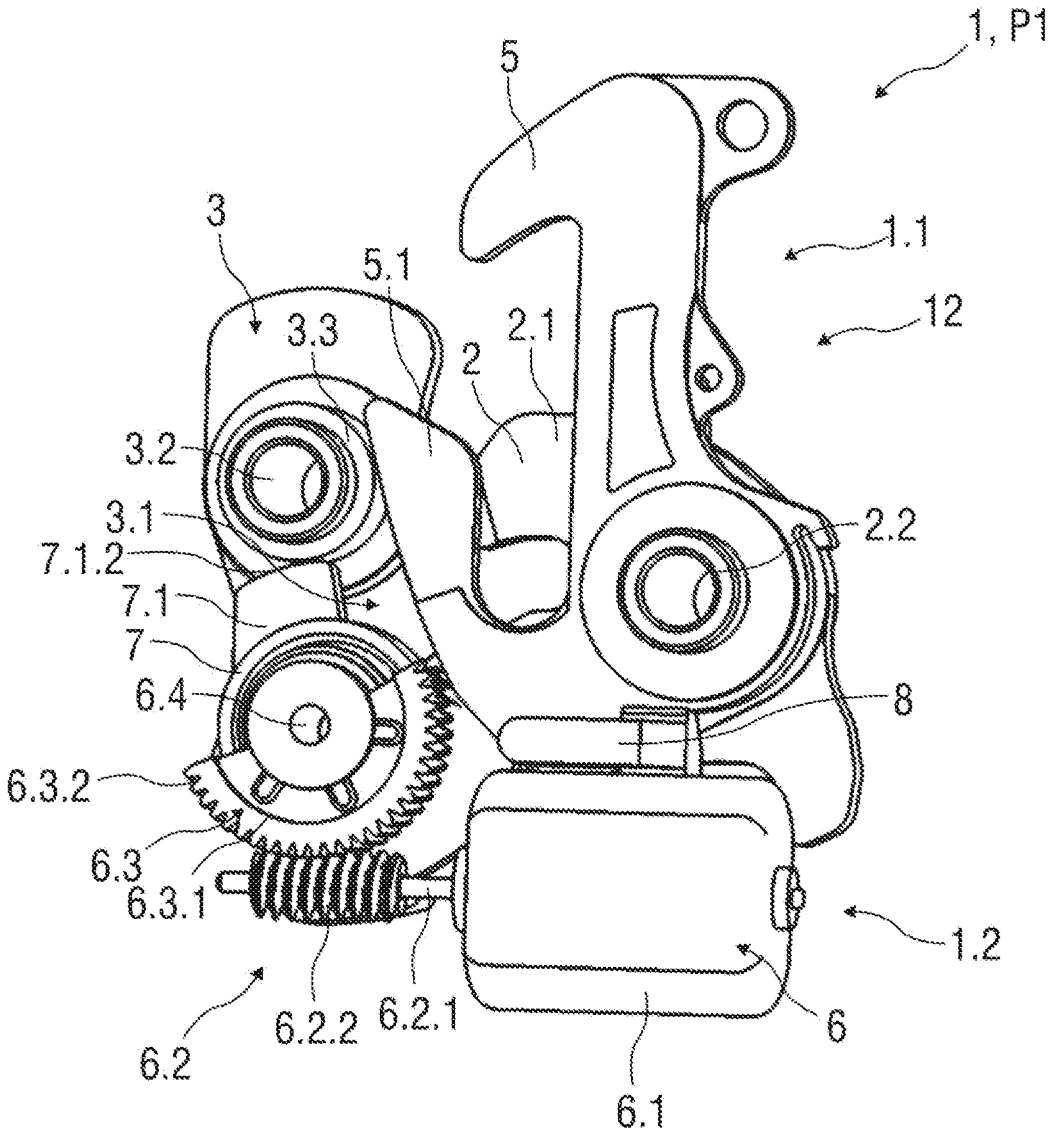
FIG. 2 shows a schematic further perspective view of the lock arrangement with an actuating drive, wherein the lock arrangement is shown in the closed position (locked and closed)

FIG. 1 shows a perspective view of the lock arrangement 1 with the actuating drive 6. The actuating drive 6 is designed, for example, as a two-way drive with two actuating directions R1 and R2 for opening or closing the lock arrangement 1, in particular a single-step or multi-step opening or closing of the lock arrangement 1. FIG. 2 shows a slightly modified perspective view of the lock arrangement 1 according to FIG. 1.

FIGS. 1 and 2 each show the lock arrangement 1 in the closed position P1.

The lock arrangement 1 comprises at least the locking element 4, for example a locking retainer or a locking bolt, the rotary catch 2, the security element 5 and the locking mechanism 3 for locking the rotary catch 2 and the security element 5 in the closed position P1, in which the rotary catch 2 and the locking element 4 are coupled in a locking manner.

The actuating drive 6 is coupled to the locking mechanism 3 and the cam 7 and interacts therewith in such a way that opening and closing of the lock arrangement 1 is made possible by means of a single actuating drive 6.

The spindle drive 6.2 comprises the spindle 6.2.1 with the thread 6.2.2 or a tooth profile. The spindle 6.2.1 is also called threaded spindle. The spindle 6.2.1 is coupled to the servomotor 6.1 and is driven by the servomotor 6.1.

A transmission 6.3, in particular a gear transmission, engages in the thread 6.2.2. The gear transmission is, for example, a wheel segment 6.3.1, in particular a semicircular wheel segment 6.3.1, with an external toothing 6.3.2, in particular a semicircular external toothing 6.3.2, which engages in the thread 6.2.2 and rolls on it. In this case, the transmission 6.3 is moved between two end positions by means of the spindle 6.2.1 when the servomotor 6.1 is actuated. Alternatively, the wheel segment 6.3.1 can be designed as a disk segment, in particular a semicircular disk segment, or a toothed wheel 6.3.3 (shown in FIG. 13), in particular a semicircular or circular toothed wheel, with an external toothing 6.3.2, in particular semicircular or circular external toothing.

The locking mechanism 3 is designed as a pawl 3.1 which is rotatably mounted on a bearing pin 3.2.

The cam 7 is coupled to the transmission 6.3 for conjoint rotation. The transmission 6.3 is mounted rotatably about an axis of rotation 6.4, for example on the carrier element.

During a first actuation, the actuating drive 6, in particular the servomotor 6.1, actuates the cam 7 in a first actuation direction R1 and a second actuation in a second actuation direction R2 and drives it. In addition, during the first actuation, the actuating drive 6 can actuate the locking mechanism 3, in particular the pawl 3.1, directly or indirectly via the cam 7 according to arrow PF3 in order to unlock the rotary catch 2.

The actuating drive 6 interacts with the cam 7, wherein the cam 7 is formed in such a way that, during the first actuation of the actuating drive 6, both in one step and in separate steps and in different sequences, the cam 7 unlocks the rotary catch 2 and locks the security element 5, or conversely the cam 7 locks the security element 5 and unlocks the rotary catch 2.

For this purpose, the cam 7 can have, for example, at least two surfaces with different cam contours 7.1. For example, the cam 7 has a first surface 7.01 and a second surface 7.02, which can each be formed as an opening surface and/or as a locking surface. An opening surface is understood to mean that the respective first surface 7.01 or second surface 7.02 presses against a movable element, such as the rotary catch 2 and/or the pawl 3, in order to move it. A locking surface is understood in accordance with the invention to mean that the respective first surface 7.01 or second surface 7.02 presses against a movable element, such as the security element 5, in order to lock the latter and thus prevent a movement.

The first surface 7.01 and the second surface 7.02 can have different curvatures and/or dimensions, for example. For example, the cam 7 comprises a round base region, from which the first surface 7.01 and the second surface 7.02 protrude to a different extent. The first surface 7.01 is, for example, a circular-segment-shaped protruding tab. The second surface 7.02, for example, protrudes more strongly from the round base region of the cam 7 than a further separate, circular-segment-shaped protruding tab. In other words, the two surfaces 7.01, 7.02 have different heights.

Depending on the arrangement (initial orientation) of the surfaces 7.01, 7.02 relative to the security element 5, the pawl 3 and the rotary catch 2, for example

Figure 6:
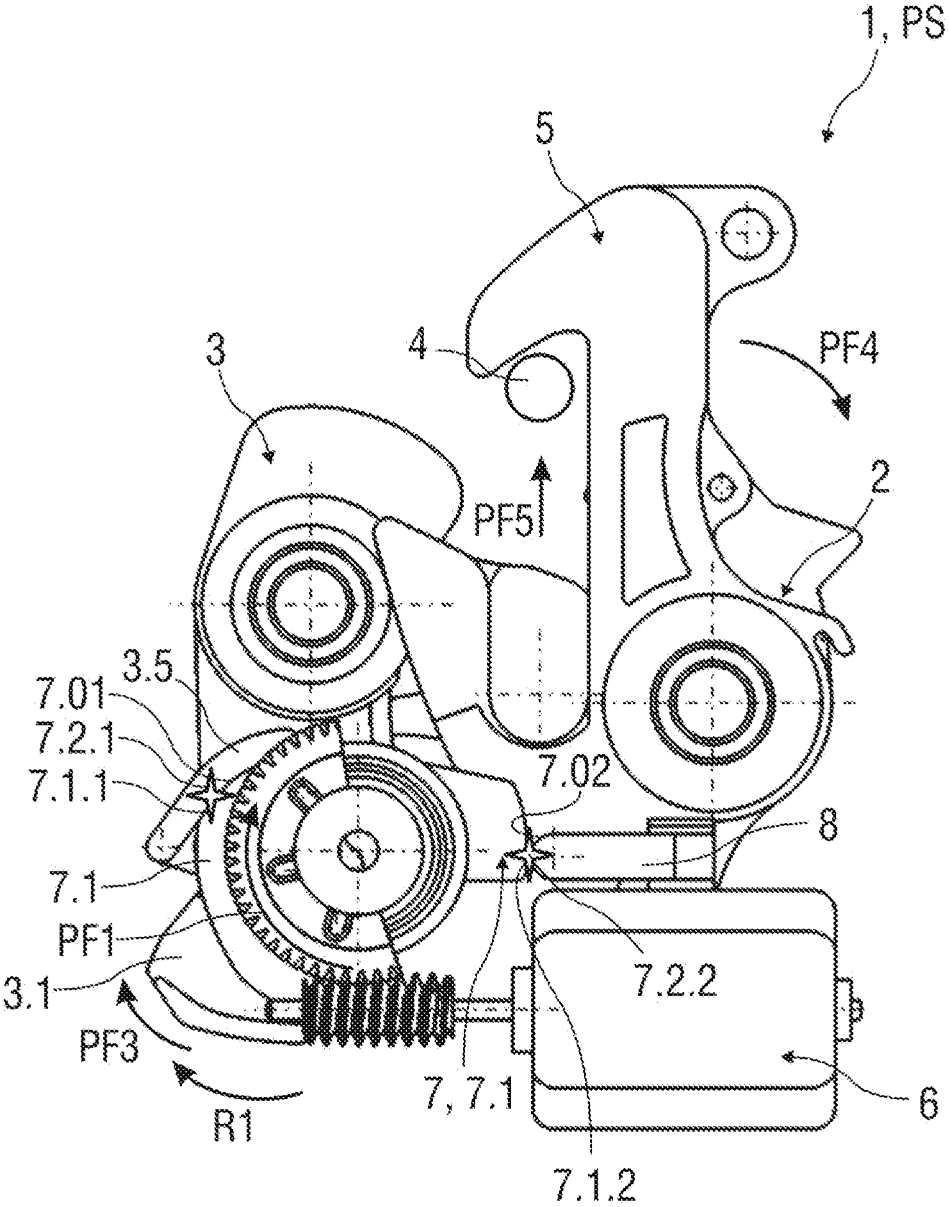
FIG. 6 shows a schematic view of the lock arrangement in a secured position (unlocked and secured/locked) after simultaneous unlocking of the rotary catch and locking of the security element for the locking element.

- the first surface 7.01 can be formed
  - as an opening surface for the rotary catch 2 directly (not shown) or directly for the security element 5 (shown in the example according to FIG. 4) or indirectly via the pawl 3 (shown in the example according to FIG. 6) or
  - as a locking surface for the security element 5 (shown in the example according to FIG. 3), and/or
- the second surface 7.02 can be formed
  - as an opening surface for the rotary catch 2 directly (not shown) or indirectly via the pawl 3 (shown in the example according to FIG. 3) or can be formed as a locking surface directly (not shown) or indirectly (by means of the blocking element 8, shown in the example according to FIG. 6).

In addition, the movement of the actuating drive 6 in the respective actuation direction R1 or R2 can be limited by an end stop.

For the secure unlocking of the rotary catch 2 and release and opening of the rotary catch 2 and for simultaneous locking of the security element 5 of the first embodiment of the lock arrangement 1, the actuating drive 6 is actuated in the first actuation direction R1. In this case, the movement of the actuating drive 6 is transmitted via the transmission 6.3 to the cam 7, which, as a result, is moved in the clockwise direction according to arrow PF1, for example.

During this actuation of the actuating drive 6 in the first actuation direction R1, the cam 7 unlocks the rotary catch 2 and locks the security element 5, as shown in FIG. 6.

In other words, the actuating drive 6 interacts with the cam 7 in such a way that, during this first actuation of the actuating drive 6, the cam 7 in one step unlocks the rotary catch 2 and locks the security element 5, or vice versa, so that the locking element 4 is released, but is still held securely. The cam 7 has a corresponding cam contour 7.1, which enters into a releasable locking connection with the pawl 3.1 in a first locking region 7.2.1 and locks it and/or which enters into a releasable locking connection with a blocking element 8 in a second locking region 7.2.2 and locks the security element 5.

For this purpose, the cam contour 7.1 has, for example, a first locking contour 7.1.1 and a second locking contour 7.1.2. The locking contours 7.1.1, 7.1.2 are each designed, for example, as contours which protrude radially from the cam 7, in particular in a curved or arc-shaped manner.

The security element 5 is locked against unlocking by means of the cam 7. The pawl 3.1 is locked against unlocking by means of the cam 7.

In the associated first locking region 7.2.1, the first locking contour 7.1.1 enters into a locking engagement with the pawl 3.1, in particular a pawl counter contour 3.5. In the associated second locking region 7.2.2, the second locking contour 7.1.2 enters into a locking engagement with the blocking element 8, in particular a corresponding counter contour 5.5.

Several variants in the temporal sequence of the unlocking and/or locking of the rotary catch 2 and the security element 5 are made possible by means of the cam 7.

For example, when the lock arrangement 1 is closed during the first actuation of the actuating drive 6 by means of the cam 7, the rotary catch 2 can simultaneously be unlocked and the security element 5 and the pawl 3.1 can be locked, as is shown in the sequence of the FIGS. 1 to 6.

Alternatively, by means of the cam 7 during the first actuation of the actuating drive 6, the rotary catch 2 can initially be unlocked in a first step and then the security element 5 can be locked in a second step, as is shown in the sequence of FIGS. 7 to 12. In a further alternative, the cam 7 can lock the security element 5 and unlock the rotary catch 2 in one step or in separate steps.

As a result of the unlocking of the rotary catch 2, it automatically goes from a locked position into a free position according to arrow PF4. This releases the locking element 4.

The locking element 4 transitions into a secured position PS, in which the safety element 5 secures the locking element 4 against release, and the cam 7 locks the security element 5 and the pawl 3.1 against unlocking (as shown in FIGS. 6, 8, 9 and 12). This ensures that, despite the open rotary catch 2, the lock arrangement 1 does not spring open or completely open, since the locking element 4 is held in the secured position PS by means of the security element 5, for example a safety hook, and the security element 5 and/or the pawl 3.1 is locked against unlocking by means of the cam 7.

A spring element, in particular a return spring, can be provided for automatically moving the rotary catch 2. For example, the rotary catch 2 is held in the position locking the locking element 4 (locked position of the rotary catch 2) in a spring-pretensioned manner by means of the spring element and the locking mechanism 3. If the rotary catch 2 is unlocked, the spring element automatically sets the rotary catch 2 into a position releasing the locking element 4. As a result, the locking element 4 is released by the rotary catch 2 and is unlocked, but is still placed in a position PS secured by the security element 5 and is held there in a secured manner. For this purpose, the security element 5 is locked by means of a releasable locking connection, in particular a releasable force-fit connection, of cam 7 and blocking element 8.

For subsequent unlocking and opening of the security element 5, the actuating drive 6 is moved further in the actuation direction R1. This movement is transmitted via the transmission 6.3 to the cam 7, which is moved further in the clockwise direction, for example, according to arrow PF1. The cam 7 releases the security element 5, and this is unlocked and opened, for example automatically, in particular in a spring-assisted manner. The locking element 4 is thus free and is automatically moved, for example in a spring-assisted manner, from the secured position PS into an open position P2 of the lock arrangement 1 (shown in FIG. 4). Thus, the lock arrangement 1 can be opened and at the same time secured in steps by means of a single actuating drive 6.

The locking element 4 is designed, for example, as a conventional locking retainer, which is fastened in particular to a movable part of the vehicle, such as an engine hood. The lock arrangement 1 is fastened to a frame on the vehicle body (not shown in greater detail), for example.

The rotary catch 2 is designed, for example, as a claw 2.1 which is held rotatably on the carrier element of the locking module 1.1 by means of a fastening rivet 2.2. The rotary catch 2 additionally comprises a spring element, for example a return spring or tension spring. By means of the spring element, the rotary catch 2, and thus in particular the claw 2.1, is automatically moved during unlocking from a locked position, as shown in FIGS. 1, 5, 7 and 8, into an open position, as shown in FIG. 4. The open position of the rotary catch 2 is a position unlocking the locking element 4, in which the locking element 4 can be placed into an unlocked position, but still secured by the security element 5, and is shown, for example, in FIGS. 3, 8, 9 and 12.

The locking mechanism 3 is formed, for example, from the pawl 3.1, which is rotatably mounted on the carrier element (not shown) via a fastening rivet or the bearing pin 3.2. The locking mechanism 3 can additionally comprise a ratched spring element (not shown in greater detail). The ratched spring element is designed, for example, as a return spring or tension spring. By means of the ratched spring element, the pawl 3.1 is automatically placed back into the locking position, in which it locks the rotary catch 2 against opening the lock arrangement 1.

The security element 5 is formed, for example, as a claw-shaped hook 5.1. The security element 5 is mounted rotatably about an associated axis of rotation 5.2 on a carrier.

The cam 7 can be formed separately. The cam 7 can be part of the locking module 1.1 or of the drive module 1.2. In the exemplary embodiment, the cam 7 is part of the drive module 1.2 and is coupled to the transmission 6.3 for example for conjoint rotation. For example, the cam 7 and the transmission 6.3 are rotatably mounted on an associated bearing pin 9 about the axis of rotation 6.4.

The cam 7 is designed, for example, as a circular segment or a rotary arm with an outer cam contour 7.1.

The blocking locking element 8 is arranged, in particular integrally molded, on the security element 5, for example. The blocking element 8 is designed, for example, as a locking arm protruding from the security element 5 and pointing in the direction of the cam 7.

Figure 3:
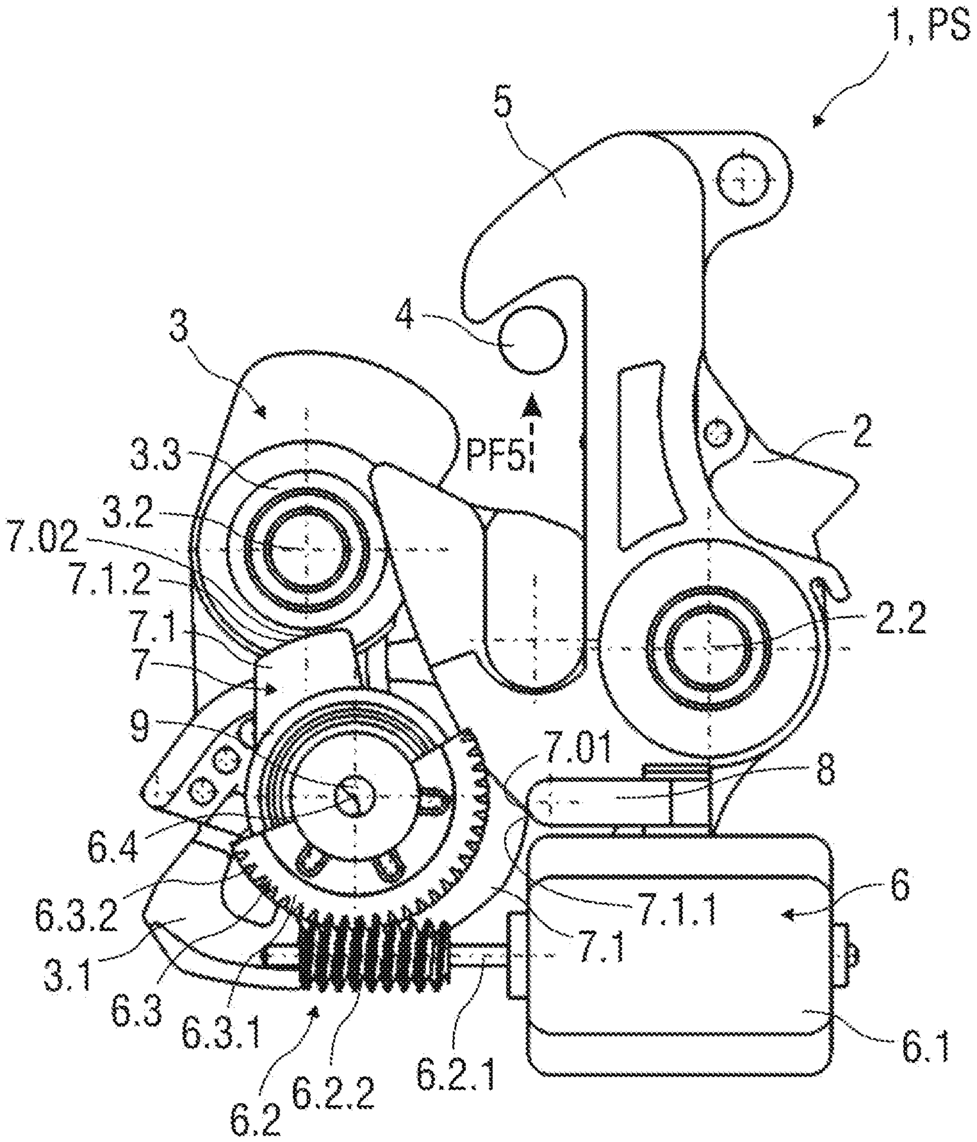
FIG. 3 shows a schematic view of a lock arrangement in a secured position (unlocked and secured)
Figure 4:
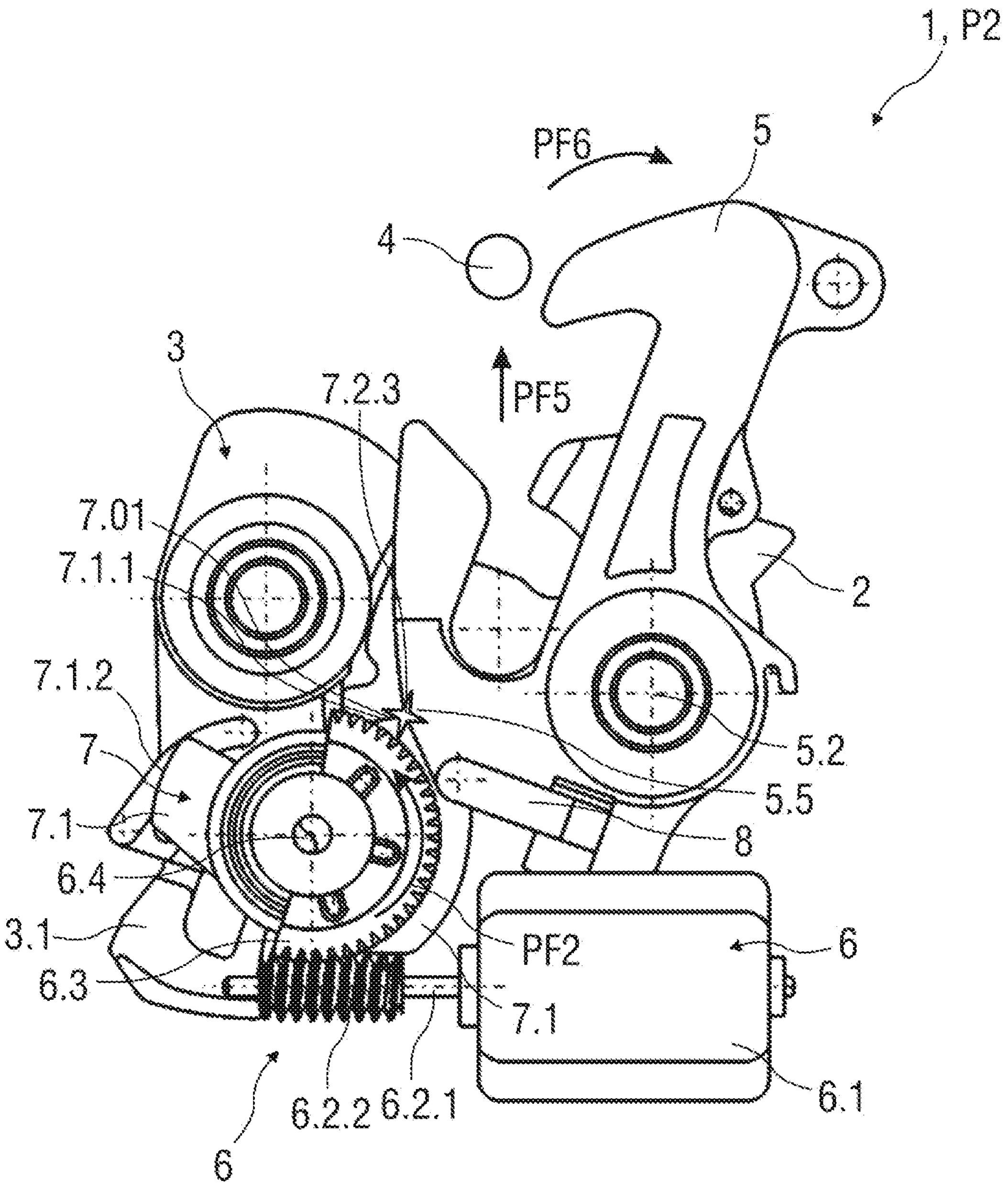
FIG. 4 shows a schematic view of the lock arrangement in an open position (opened)

FIG. 3 shows the lock arrangement 1 in an initial position before opening the lock arrangement 1, for example in the secured position PS, in which the rotary catch 2 is unlocked and the locking element 4 is secured by means of the security element 5.

FIGS. 3 and 4 show the sequence of a single-stage method with a simultaneous opening of the rotary catch 2 and locking of the security element 5 by means of the cam 7 in the open position P2, shown in FIG. 4.

FIG. 4 shows the lock arrangement 1 in its open position P2, in which the rotary catch 2 is still unlocked and the security element 5 is unlocked and opened according to arrow PF6, in particular is pivoted about the axis of rotation 5.2, and the locking element 4 is released in order to move into the open position P2 according to arrow PF5.

During the second actuation of the actuating drive 6, the spindle drive 6.2 is rotated by means of the servomotor 6.1 in the second actuation direction R2, which oppositely to the first actuation direction R1. In this case, the safety element 5 is unlocked or unblocked and pivots automatically about the axis of rotation 5.2. The locking element 4 is released and can be placed into the open position P2 of the lock arrangement 1, for example as a result of the engine hood being opened by the movable element for example.

At the same time, the cam 7, in particular its second locking contour 7.1.2 in a third locking region 7.2.3, engages with a counter contour 5.5 on the security element 5, so that the security element 5 is held in the open position P2.

Figure 5:
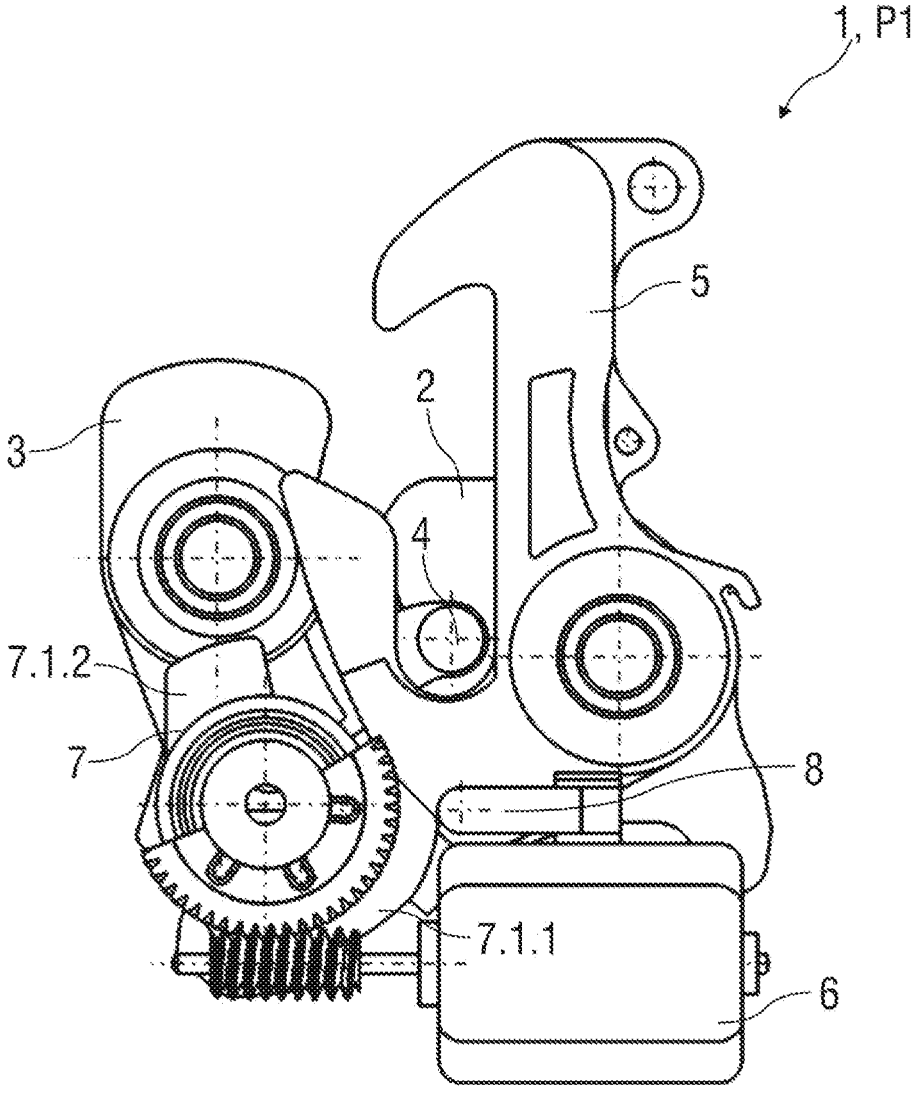
FIG. 5 shows a schematic view of a lock arrangement in a closed position (initial position, locked and closed) and before simultaneous unlocking of the rotary catch and locking of a safety element for the locking element.

FIGS. 5 and 6 show a one-step method with simultaneous opening of the rotary catch 2 and locking of the security element 5 by means of the cam 7 in the secured position PS of the lock arrangement 1.

FIG. 5 shows the lock arrangement 1 in the closed position P1, an initial position of the lock arrangement 1, in which the rotary catch 2 is locked and is coupled to the locking element 4 in closed fashion. FIG. 5 shows the lock arrangement 1 before a simultaneous unlocking of the rotary catch 2 and locking of the safety element 5 for the secured position PS of the lock arrangement 1, in which the locking element 4 is released but is still held securely.

FIG. 6 shows the lock arrangement 1 in the secured position PS, in which the rotary catch 2 is unlocked and the locking element 4 is secured, after simultaneous unlocking of the rotary catch 2 and locking of the security element 5 for a secured holding of the released locking element 4 by means of the cam 7.

The actuating drive 6 is actuated in the first actuation direction R1, as a result of which the transmission 6.3 and the cam 7 are moved according to arrow PF1 and the pawl 3.1 is moved according to arrow PF3. The rotary catch 2 is unlocked so that the locking element 4 is released and moves according to arrow PF5. The first locking contour 7.1.1 and the second locking contour 7.1.2 of the cam 7 simultaneously enter into a locking engagement with the pawl 3.1, in particular with its pawl counter contour 3.5, in the first locking region 7.2.1 or with the blocking element 8 on the security element 5 in the second locking region 7.2.2, respectively, so that the security element 5 is locked against unlocking.

Figure 7:
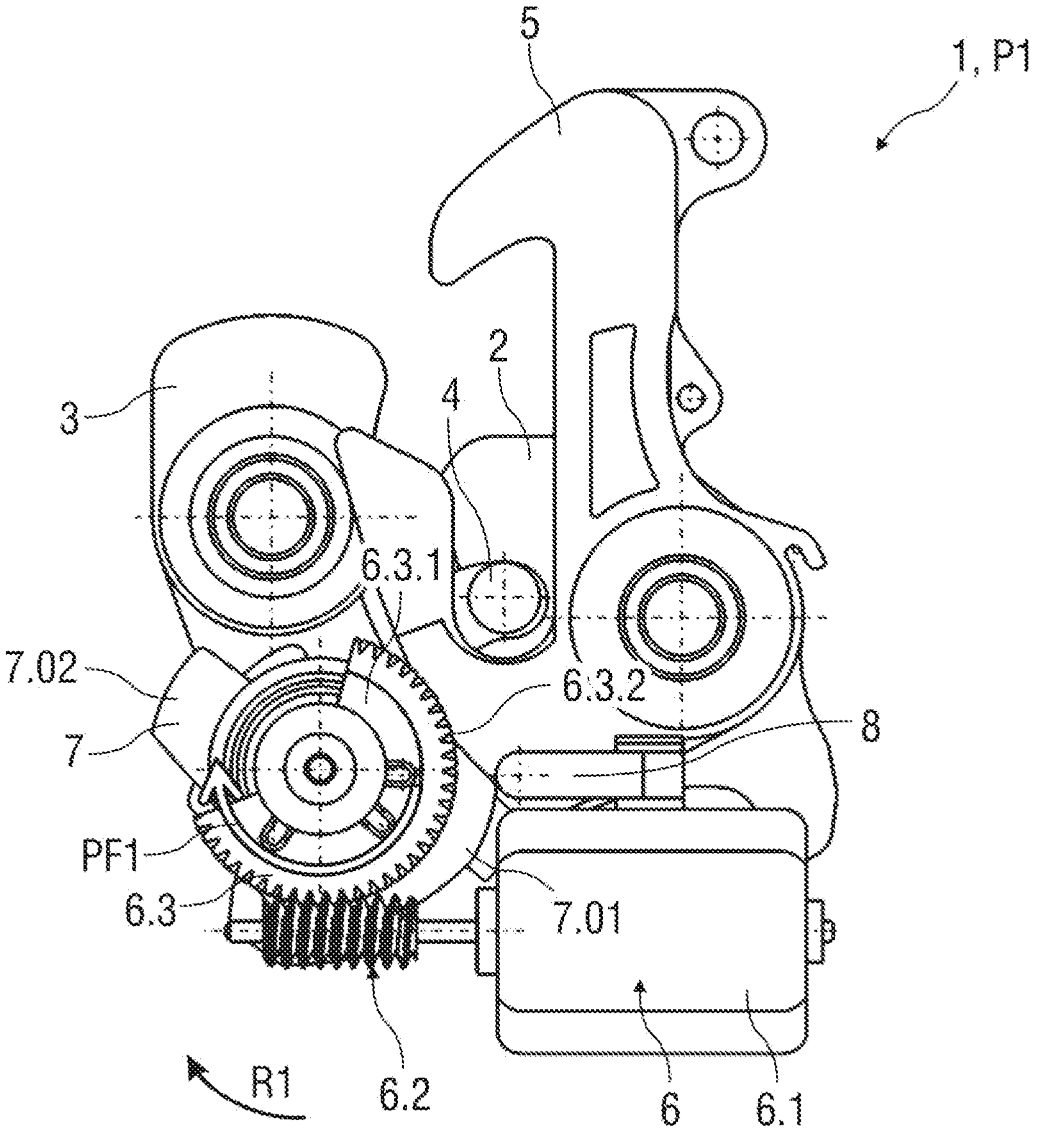
FIG. 7 shows a schematic view of a second embodiment of a lock arrangement in a closed position (initial position, locked and secured) and before a sequential unlocking of the rotary catch and locking of the security element for the locking element.
Figure 8:
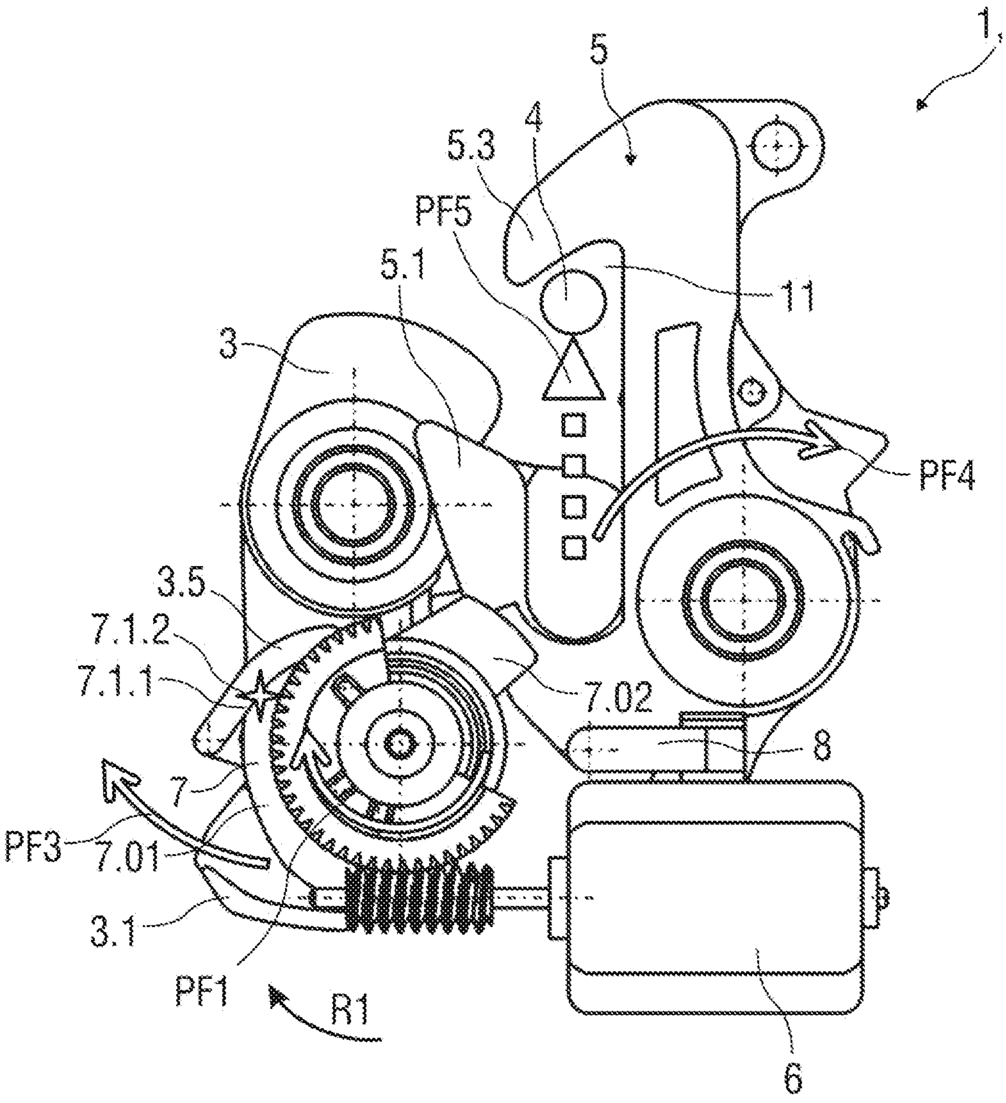
FIG. 8 shows a schematic view of the lock arrangement in a secured position (unlocked and secured) after unlocking the rotary catch and before the security element for the locking element is locked.
Figure 9:
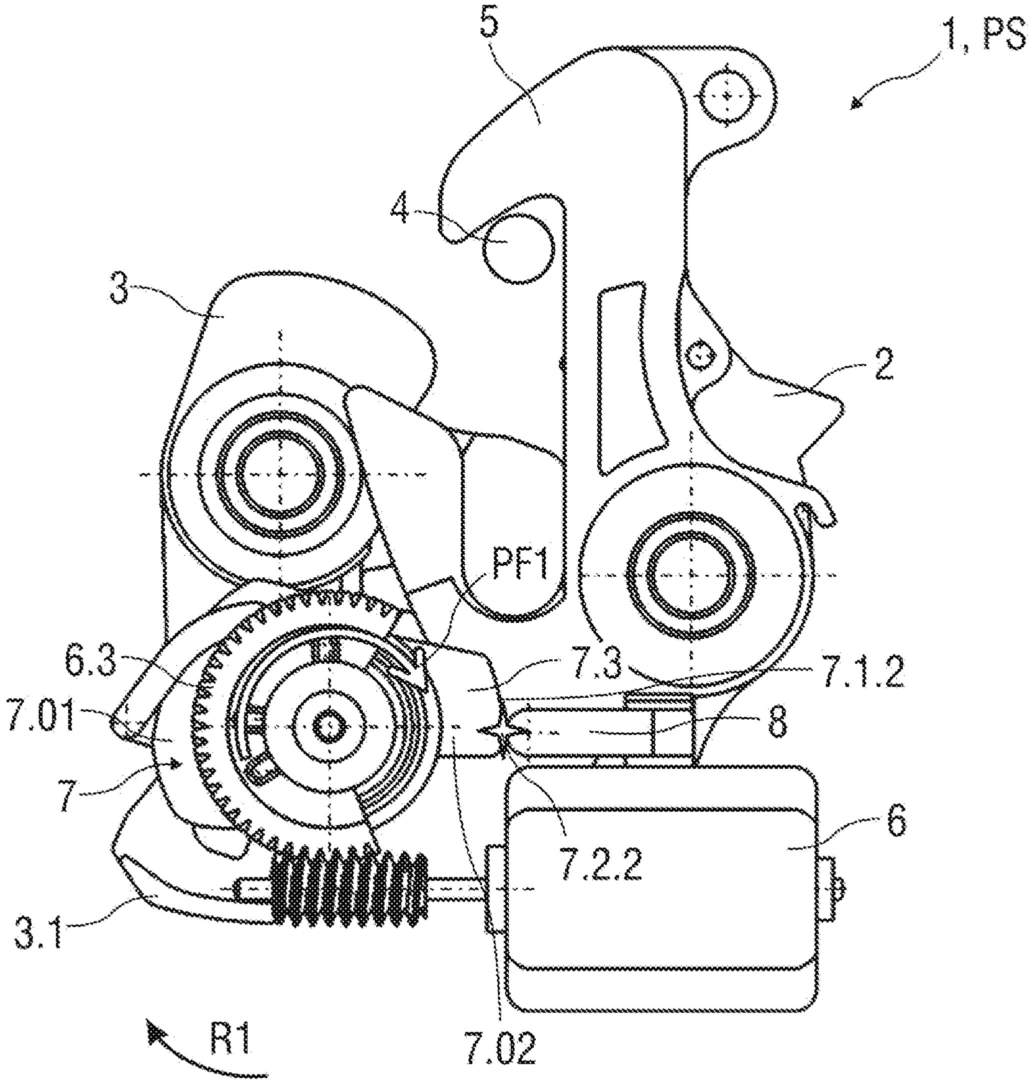
FIG. 9 shows a schematic view of the lock arrangement in the secured position (unlocked and locked) after the locking of the security element for the locking element.

FIGS. 7 to 9 show the second embodiment of the lock arrangement 1 with a multi-step method for opening the rotary catch 2 and locking the security element 5 by means of the cam 7 in the secured position PS.

Compared to the first embodiment of the lock arrangement 1, the transmission 6.3 has, as wheel segment 6.3.1, a wheel segment 6.3.1 that is round in particular between 190 degrees and 270 degrees, with a, in particular three-quarter-round, external toothing 6.3.2, in particular a semicircular external toothing 6.3.2, which engages in the thread 6.2.2 of the spindle drive 6.2 and rolls on it. In this case, the transmission 6.3 is moved between two end positions by means of the spindle 6.2.1 when the servomotor 6.1 is actuated. Alternatively, the wheel segment 6.3.1 can be designed as a disk segment, in particular a three-quarter-round or circular disk segment, or a toothed wheel 6.3.3, in particular a three-quarter-round or circular toothed wheel (shown in FIG. 13) with an external toothing 6.3.2, in particular three-quarter round or circular external toothing.

FIG. 7 shows the lock arrangement 1 in the closed position P1, for example in an initial position of the lock arrangement 1, in which the rotary catch 2 is locked and is coupled to the locking element 4 in closing fashion, and before a sequential unlocking of the rotary catch 2 and locking of the security element 5.

The actuating drive 6 is actuated in the first actuation direction R1, as a result of which the transmission 6.3 and the cam 7 are moved according to arrow PF1. As a result, the first locking contour 7.1.1 of the cam 7 engages with the pawl counter contour 3.5 of the pawl 3.1 in the associated first locking region 7.2.1 and locks this and thus also the security element 5.

FIG. 8 shows the different component movements in order to bring the lock arrangement 1 into the secured position PS, in which the rotary catch 2 is unlocked and the locking element 4 is held in a secured manner by means of the security element 5. FIG. 8 shows the lock arrangement 1 after an unlocking of the rotary catch 2 and a securing of the pawl 3.1 by means of the first locking contour 7.1.1 on the pawl counter contour 3.5 in the associated first barrier region 7.2.1 and before a locking of the security element 5 by the cam 7.

The actuating drive 6 is actuated, for example, in the first actuation direction R1, as a result of which the transmission 6.3 and the cam 7 are moved according to arrow PF1 only to the extent that the pawl 3.1 is moved according to arrow PF3 in such a way that the rotary catch 2 is unlocked and the locking element 4 is released and moves according to arrow PF5. In this case, the first locking contour 7.1.1 enters into engagement with the pawl counter contour 3.5 in the first locking region 7.2.1 and locks the pawl 3.1 and, via this, the security element 5, as in FIG. 8. The cam 7 and the blocking element 8 are still disengaged. The locking element 4 is secured by means of the security element 5, in particular a securing hook 5.3. For this purpose, the securing hook 5.3 closes an upwardly open receptacle 11 for the locking element 4. The receptacle 11 is formed by the security element 5, in particular a slot-shaped region for guiding the locking element 4.

FIG. 9 shows the lock arrangement 1 in the secured position PS and after the locking of the security element 5 directly by the cam 7. In order to lock the security element 5, the actuating drive 6 is moved in a subsequent step further in the first actuation direction R1, and consequently the transmission 6.3 and the cam 7 are moved further according to arrow PF1.

The locking mechanism 3, in particular the pawl 3.1, the rotary catch 2, the security element 5, and the locking element 4, remain in their positions according to FIG. 8.

The cam 7, in particular its second locking contour 7.1.2, in particular a locking cam 7.3, enters into a locking engagement with the blocking element 8 on the security element 5, in particular in the second locking region 7.2.2. As a result, the security element 5 is locked directly by means of the cam 7 against unlocking.

FIGS. 7 to 9 show a variant of a temporal sequence of release of the rotary catch 2 and locking of the security element 5.

Figure 10:
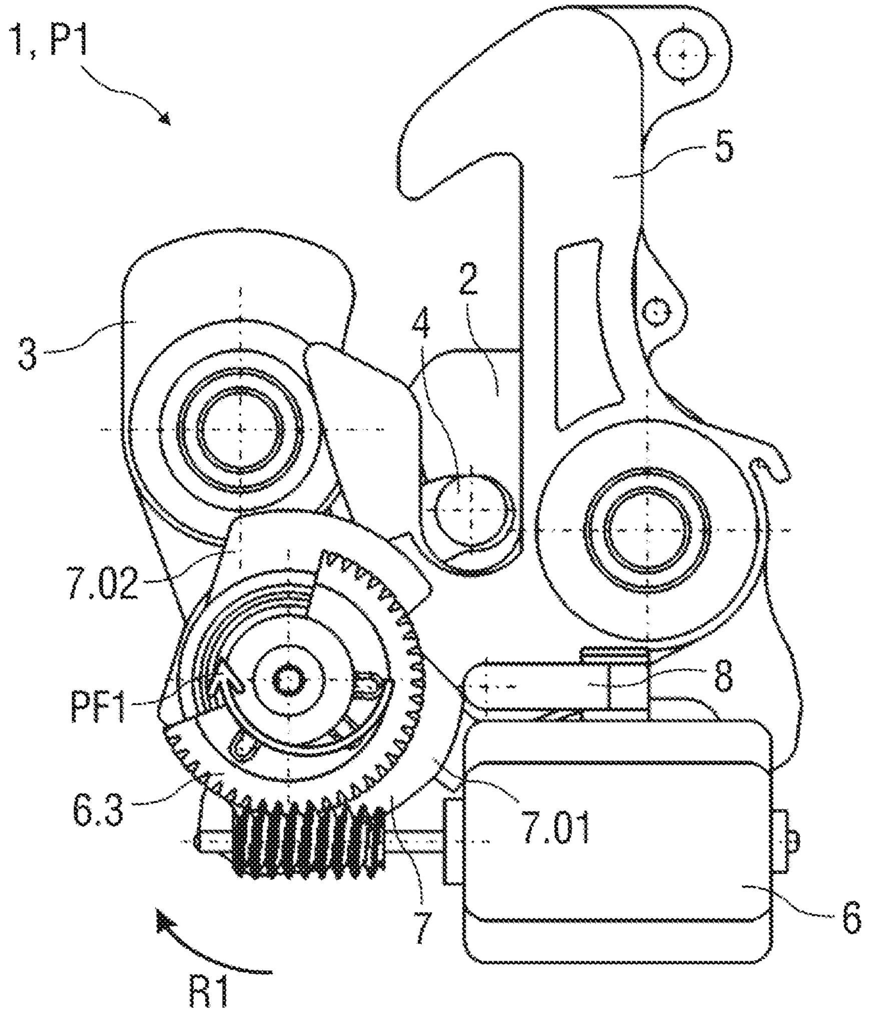
FIG. 10 shows a schematic view of a lock arrangement in a closed position (initial position, closed) and before a sequential locking of the security element for the locking element and unlocking of the rotary catch.
Figure 11:
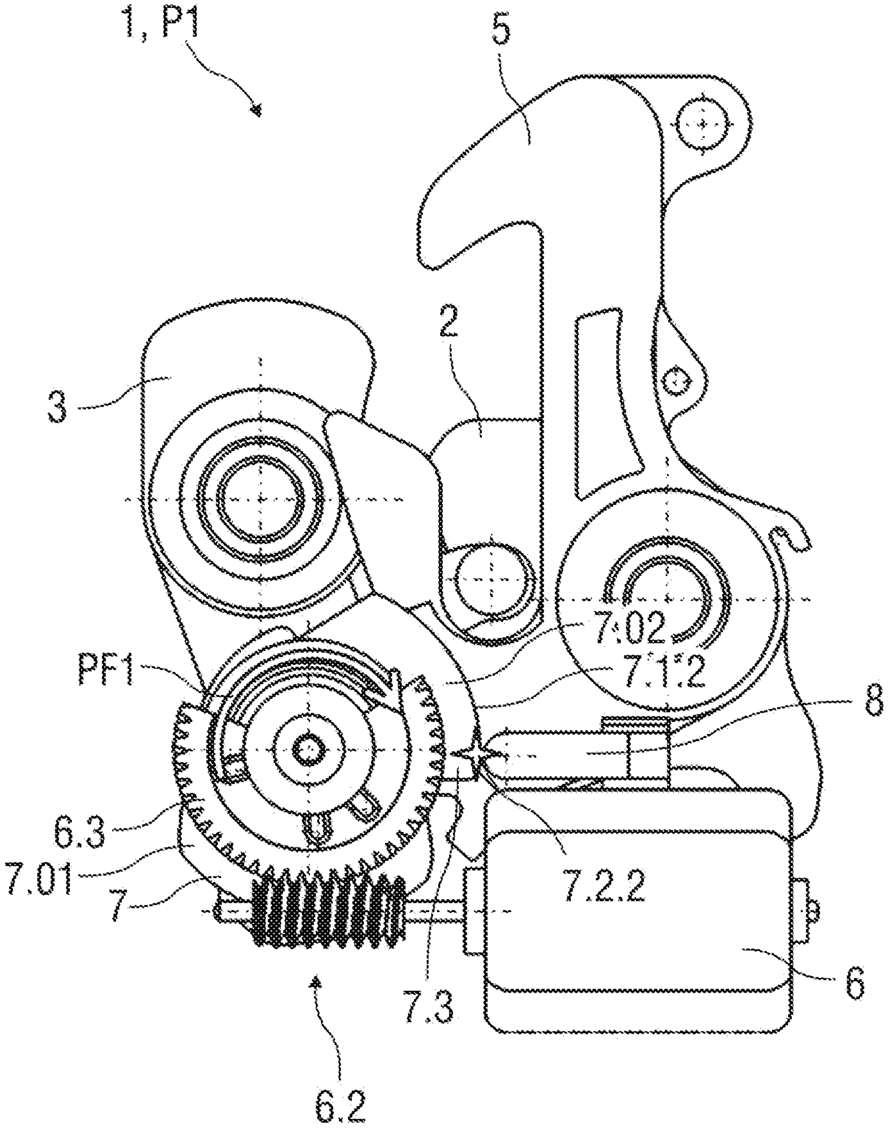
FIG. 11 shows a schematic view of the lock arrangement in the closed position (closed and secured/locked) after the security element for the locking element has been locked and before the rotary catch is unlocked.
Figure 12:
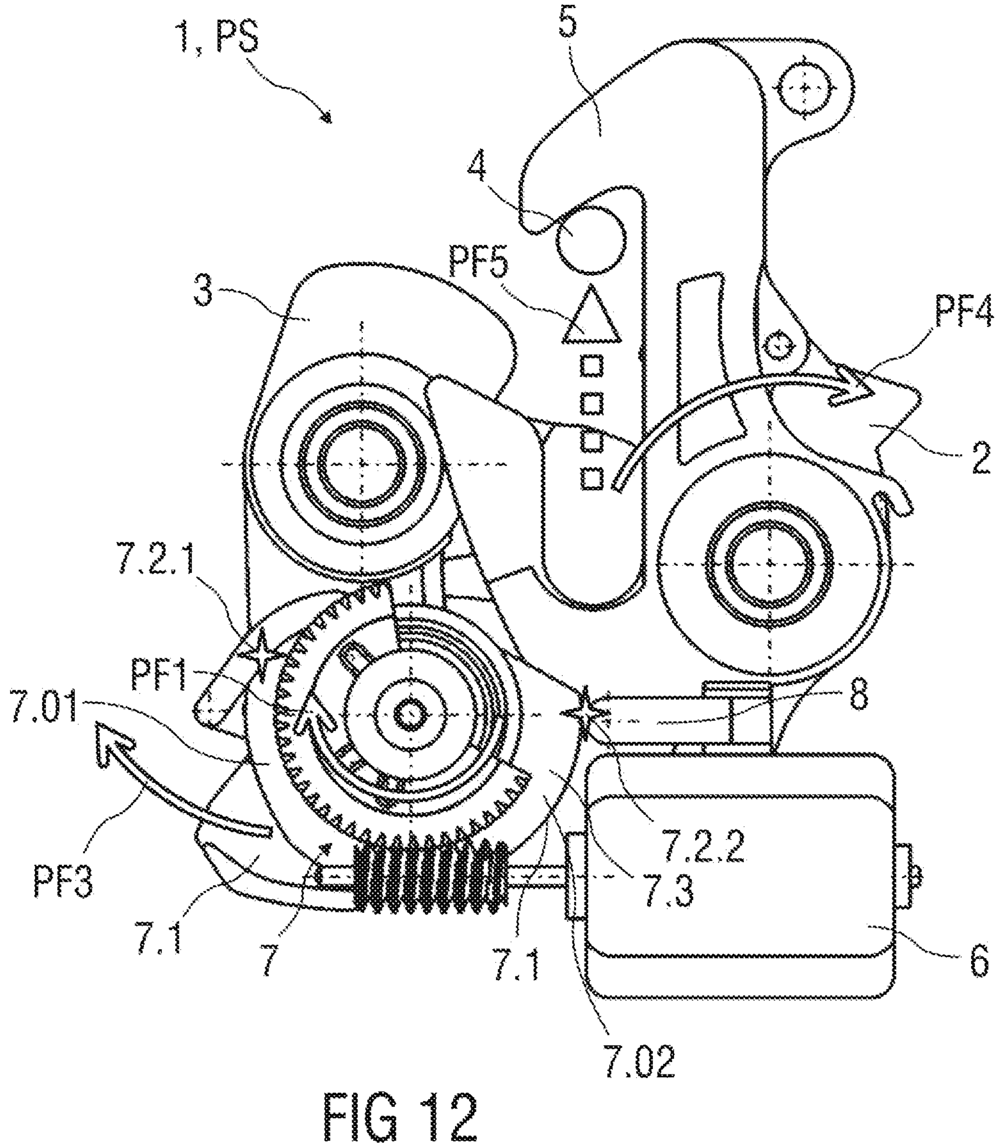
FIG. 12 shows a schematic view of the lock arrangement in the secured position (unlocked and secured/closed) after unlocking the rotary catch while maintaining the lock of the security element for the locking element.

FIGS. 10 to 12 show an alternative with a reversed time sequence, first locking of the security element 5 by means of the second locking contour 7.1.2 in the second locking region 7.2.2, then release of the rotary catch 2.

FIG. 10 shows the lock arrangement 1 in the closed position P1, an initial position in which the rotary catch 2 is locked, the locking element 4 is coupled in closing fashion to the rotary catch 2, and the security element 5 is not locked by the cam 7, and before a sequential locking of the security element 5 by the cam 7 and subsequent unlocking of the rotary catch 2 when the security element 5 is locked by means of the cam 7 (as shown in FIG. 11).

In order to lock the security element 5, the actuating drive 6 is moved in the first actuation direction R1 and consequently the transmission 6.3 and the cam 7 are moved further according to arrow PF1.

As a result, the locking cam 7.3 enters into a locking engagement on the blocking element 8 of the security element 5.

The locking mechanism 3, in particular the pawl 3.1, the rotary catch 2, the security element 5, and the locking element 4, remain in their positions.

FIG. 11 shows the lock arrangement 1 after the movement according to arrow PF1 in the closed position P1, wherein the security element 5 is locked by the cam 7. The rotary catch 2 is also closed and holds the locking element 4 in the closed position P1.

FIG. 12 shows the lock arrangement 1 after unlocking the rotary catch 2 and thus in the secured position PS, in which the rotary catch 2 is unlocked and the locking element 4 is held securely by means of the security element 5, and the pawl 3.1 is locked by means of the cam 7, in particular its first locking contour 7.2.1. For this purpose, the actuating drive 6 has been actuated further in the first actuation direction R1. As a result, the transmission 6.3 and the cam 7 move according to arrow PF1, in particular clockwise, and the pawl 3.1 moves according to arrow PF3 in order to release the rotary catch 2, and thus the locking element 4, so that this can move into the secured position PS according to arrow PF5. The locking of the security element 5 is maintained here by means of the cam 7. For this purpose, the cam 7 has an arc-shaped extended cam contour 7.1 with the associated second locking region 7.2.2, which comes into locking engagement with the blocking element 8 on the security element 5.

Figure 13:
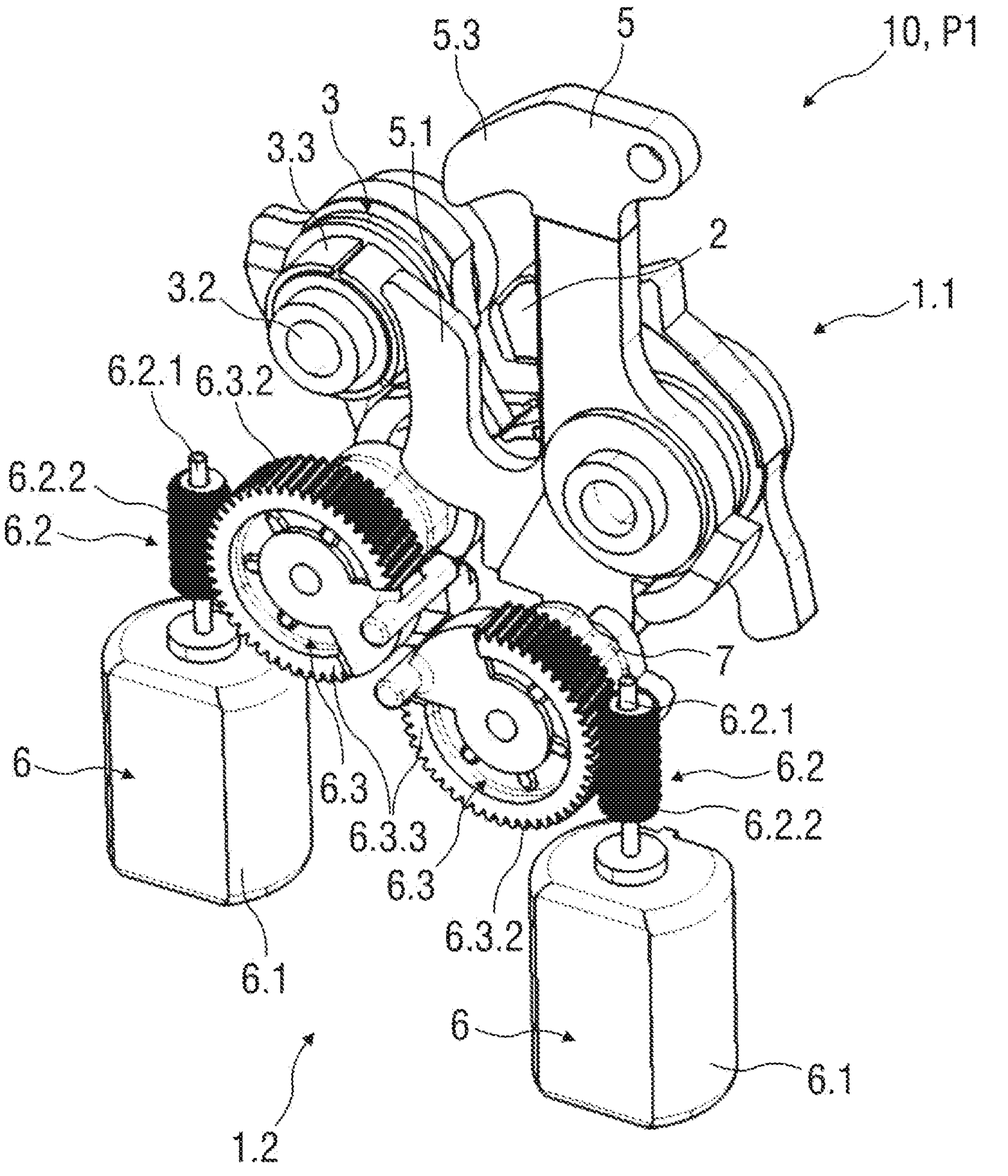
FIG. 13 shows a schematic perspective view of an alternative embodiment of a lock arrangement with two actuating drives, wherein the lock arrangement is shown in a closed position (locked and secured)

FIG. 13 schematically shows a perspective view of an alternative exemplary embodiment of a lock arrangement 10 with two actuating drives 6. The lock arrangement 10 is shown in the closed position P1 (locked and closed). The locking module 1.1 with the associated components constituted by rotary catch 2, locking mechanism 3, locking element 4 and security element 5 is constructed analogously to the locking module 1.1 according to FIGS. 1 to 12.

The exemplary embodiment of the lock arrangement 10 differs in the drive module 1.2, which comprises two actuating drives 6, two transmission 6.3 and two cams 7.

In this case, an actuating drive 6 for the security element 5 and an actuating drive 6 for the rotary catch 2 are provided. Each actuating drive 6 is constructed similarly to the actuating drive 6 according to FIGS. 1 to 12 and comprises the servomotor 6.1, which is coupled on the output side to a spindle drive 6.2. The spindle drive 6.2 comprises a spindle 6.2.1 with a thread 6.2.2.

The transmission 6.3 comprises a toothed wheel 6.3.3, in particular a circular toothed wheel 6.3.3, having an external toothing 6.3.2.

FIG. 13 shows the lock arrangement 10 in a perspective view with coupling of the drive module 1.2 and the locking module 1.1.

Figure 14:
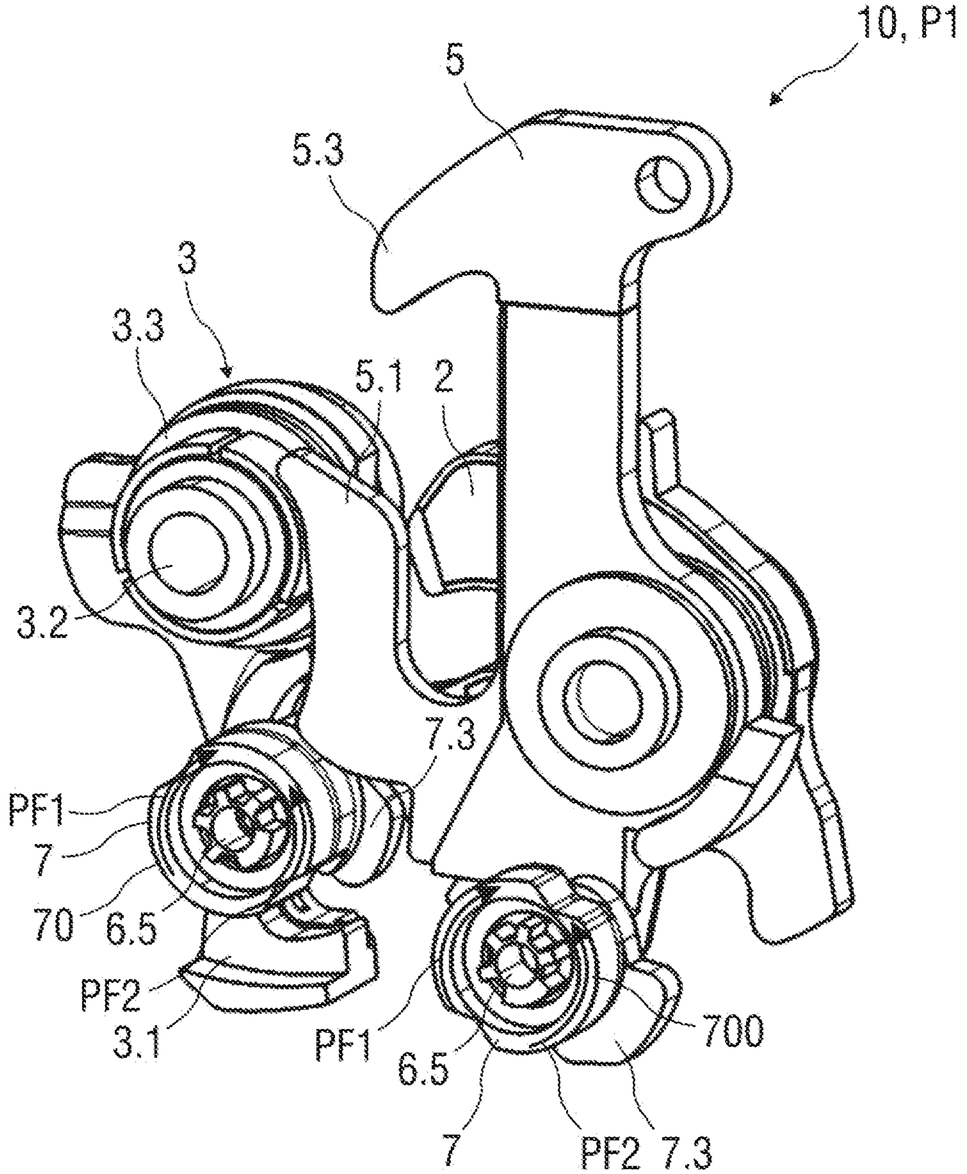
FIG. 14 shows a schematic further perspective view of the lock arrangement with two actuating drives according to FIG. 13, wherein the lock arrangement is shown in the closed position (locked and secured)
Figure 15:
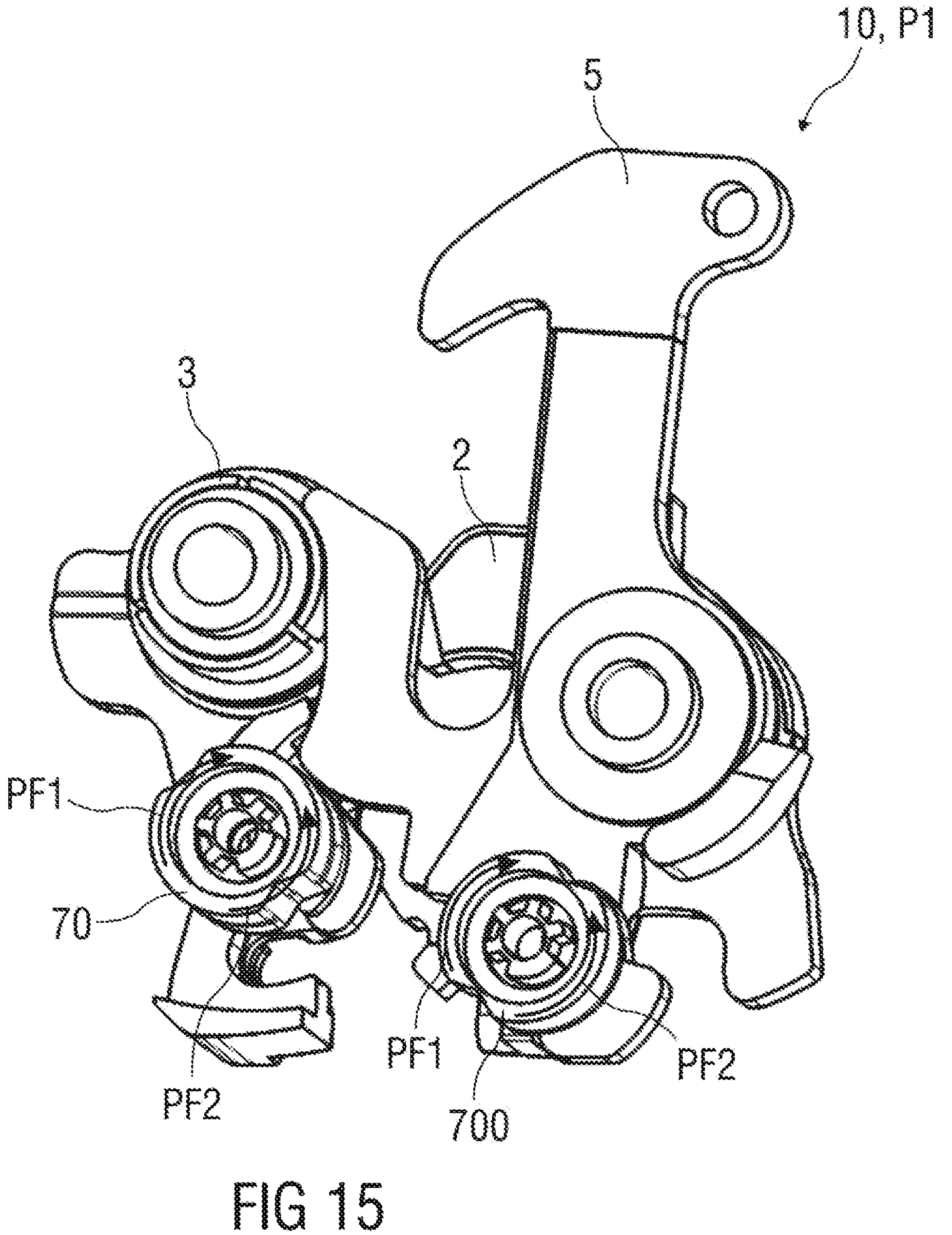
FIG. 15 shows a schematic perspective view of the lock arrangement according to FIG. 13 in the closed position as an initial position.

FIGS. 14 and 15 show the lock arrangement 10 in the same depiction as in FIG. 13 in the closed position P1 with the locking module 1.1 and only parts of the drive module 1.2, in particular its cam 7 and a drive pin 6.5 for each actuating drive 6 for coupling the cam 7 to the associated actuating drive 6.

In each case, an actuating drive 6 is provided for a cam 7 in order to drive the latter for different combinations of locking and unlocking of the rotary catch 2 and the security element 5. For this purpose, a first cam 70 is assigned to the rotary catch 2. A second cam 700 is assigned to the security element 5.

Each actuating drive 6 is designed as a two-way actuating drive and can be operated in two actuating directions R1 and R2. As a result, the cams 70 and 700 can be actuated in two directions according to arrows PF1 and PF2.

Further variants in the temporal sequence of the unlocking and/or locking of the rotary catch 2 and the security element 5 are made possible by means of the additional cams 70, 700 driven by the associated actuating drives 6. For this purpose, the actuating drives 6 can be actuated synchronously or asynchronously. The first cam 70 is configured to control the opening and closing of the rotary catch 2. The second cam 700 is configured to control the opening, closing and locking of the security element 5.

Figure 16:
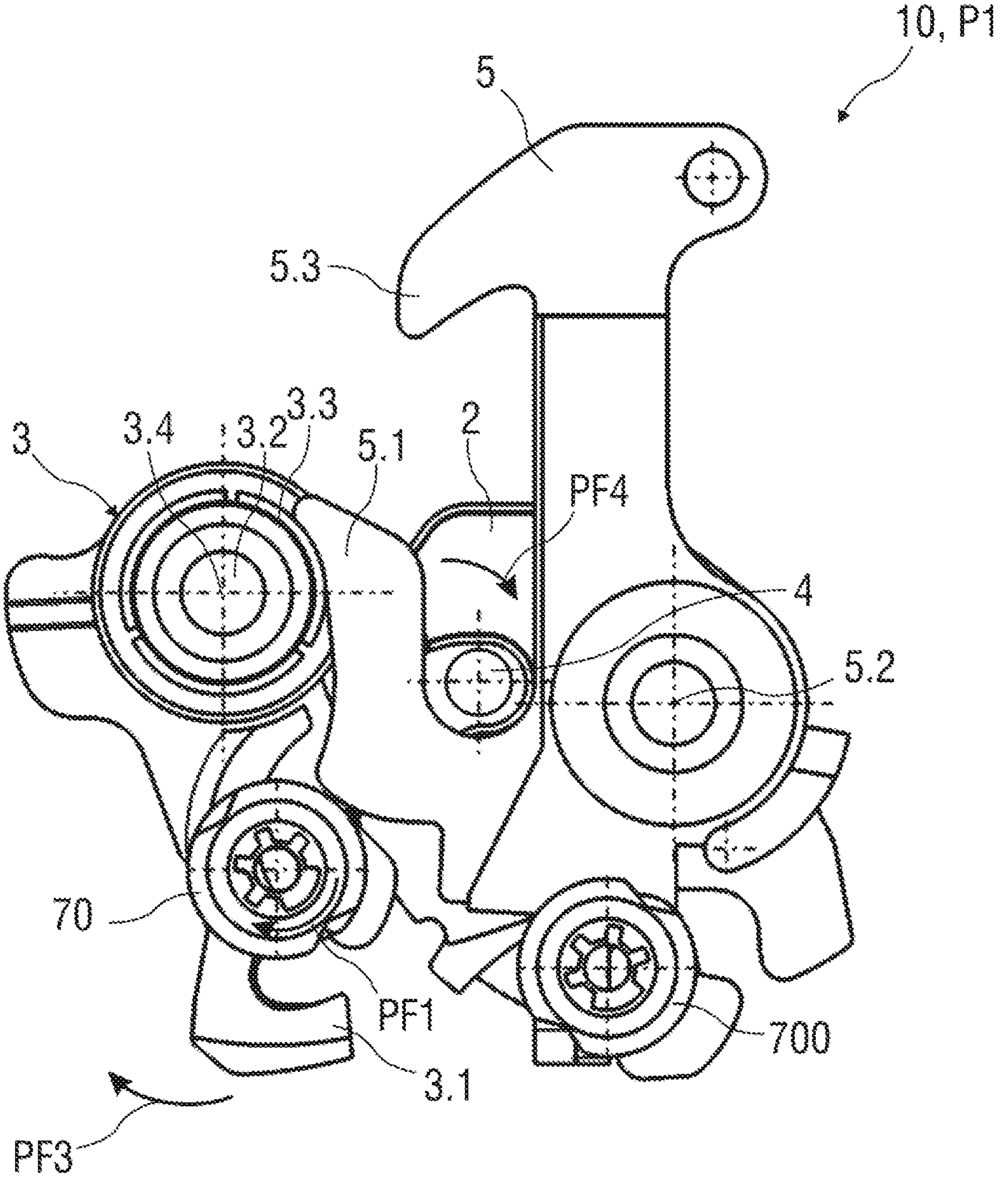
FIG. 16 shows a schematic view of the lock arrangement according to FIG. 15 in a further view.

FIG. 16 shows the lock arrangement 10 in an initial position, in the closed position P1.

The method further provides that, before the actuating drives 6 are actuated for unlocking and opening the lock arrangement 10, it is checked whether the vehicle is stationary. For this purpose, by means of a control device (not shown in greater detail), the speed of the vehicle is checked, for example to check whether it is zero. In addition, it can be checked whether the hand brake is activated. Only if one or both conditions are fulfilled, the actuating drives 6 can be activated. This prerequisite for unlocking and opening of the lock arrangement 10 can also be adapted to the individual actuating drive 6 for the lock arrangement 10 according to FIGS. 1 to 12.

Figure 17:
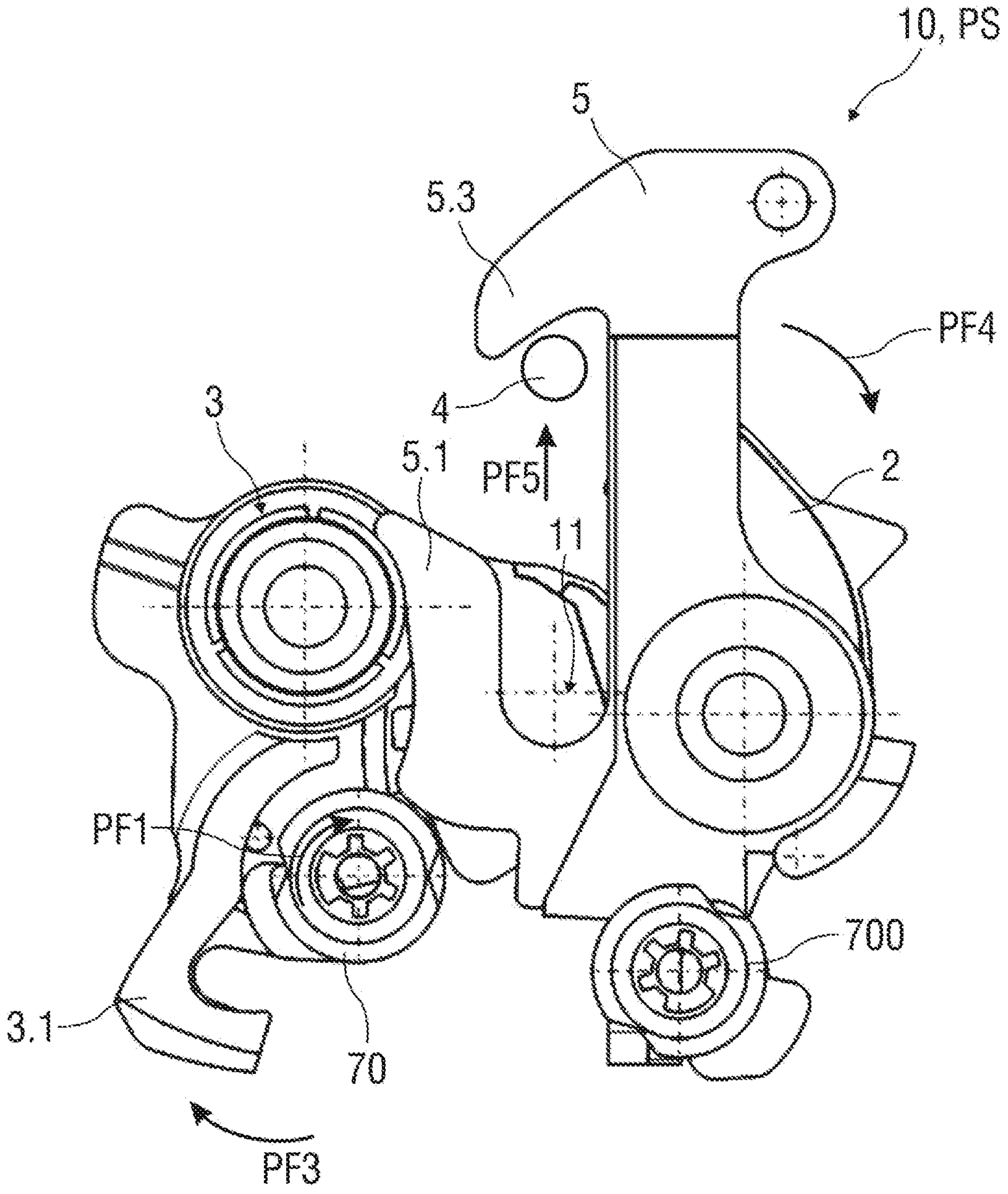
FIG. 17 shows a schematic view of the lock arrangement according to FIG. 16 after a single-step unlocking.

FIGS. 16 and 17 show a single-step unlocking of the lock arrangement 10 (also called 'primary release'). After activation of the single-stage unlocking of the lock arrangement 10, for example by pressing a button or selecting a corresponding function via a man-machine interface in the vehicle, the actuating drive 6 is actuated for the rotary catch 2 in the first actuation direction R1. Due to the coupling of the actuating drive 6 to the first cam 70, the latter is moved according to arrow PF1, as a result of which the rotary catch 2 is released. According to arrow PF3, the pawl 3.1 is moved in the same direction as the cam 70, in particular pivoted about the axis of rotation 3.4. The rotary catch 2 opens according to arrow PF4 and releases the locking element 4.

The security element 5 is blocked against unlocking by means of the locking mechanism 3.

FIG. 17 shows the lock arrangement 10 after the release of the rotary catch 2 and the placement of the locking element 4 in the secured position PS according to arrow PF5 along the receptacle 11. In this secured position PS, the locking element 4 is held by means of the security element 5.

Subsequently, the actuating drive 6 and the first cam 70 can be returned to the starting position or initial position.

Figure 18:
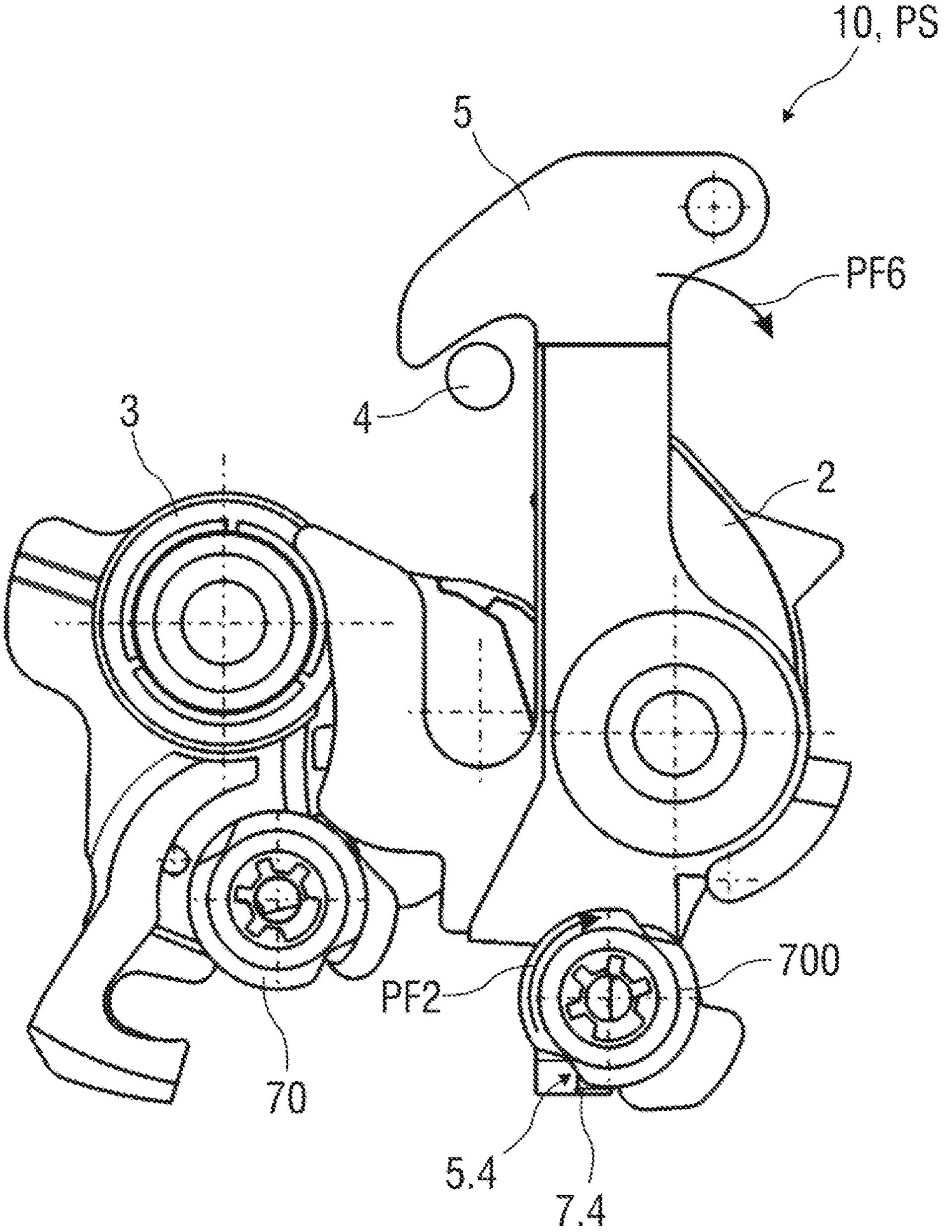
FIG. 18 shows a schematic view of a lock arrangement for an engine hood in an initial position.
Figure 19:
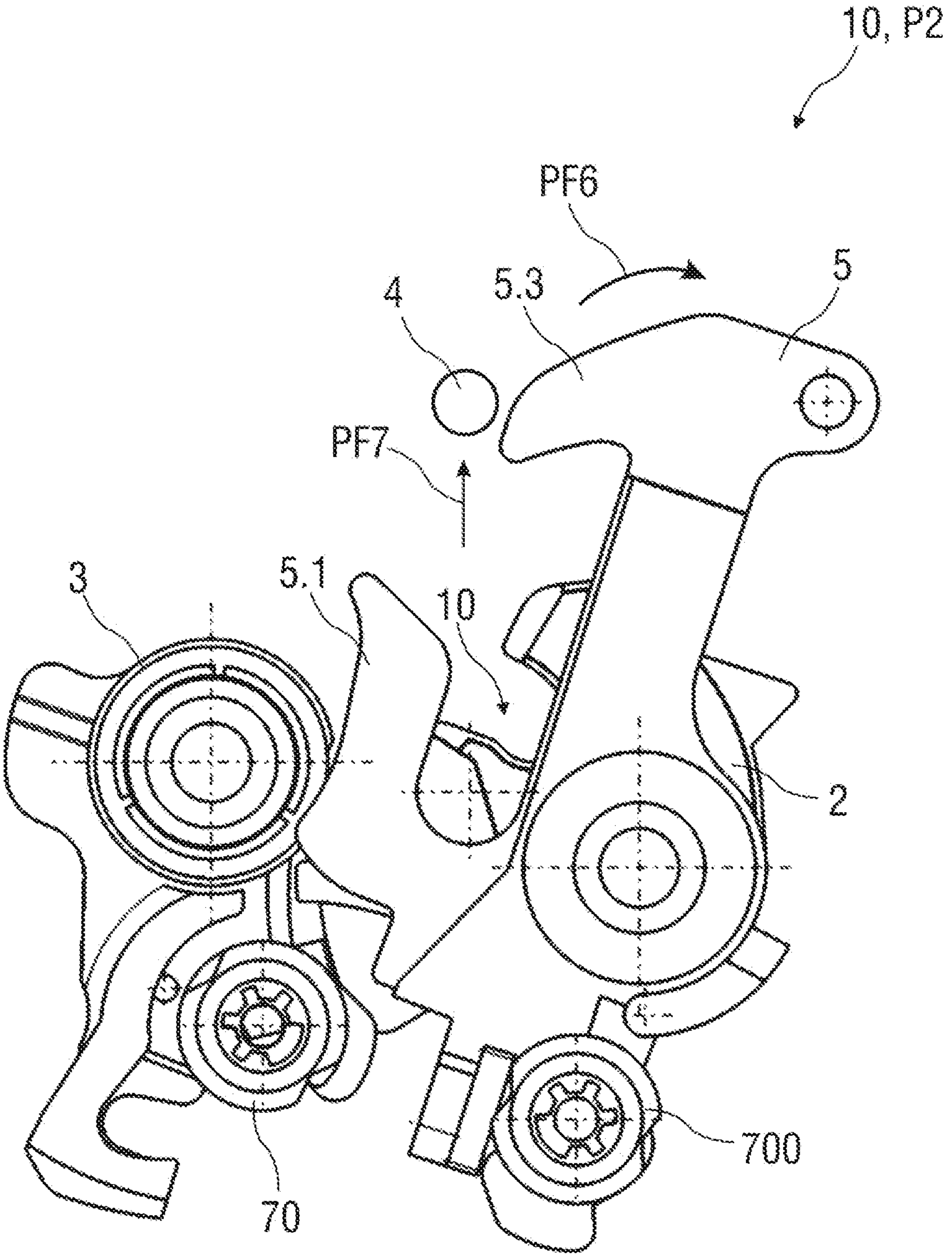
FIG. 19 shows a schematic view of the lock arrangement according to FIG. 18 in an open position.

FIGS. 18 and 19 show a method for opening the lock arrangement 10, in particular an engine hood.

The lock arrangement 10 is located as an initial position in the secured position PS, in which the locking element 4 is held in a secured manner by means of the security element 5.

It can be checked beforehand whether the vehicle is stationary. In addition, a proximity sensor can detect the approaching of a user who would like to fully open the engine hood and thus the lock arrangement 10.

If both conditions are met, the actuating drive 6 for the second cam 700 is activated and actuated with the first actuation direction R1. As a result, the second cam 700 moves according to arrow PF1, in particular in the same direction as for unlocking the rotary catch 2. The second cam 700 has a driving region 7.4 in order to increase the security element 5 during this movement according to arrow PF1 and to open the lock arrangement 10. The security element 5 has a corresponding driving contour 5.4 and moves according to arrow PF6. The locking element 4 is free and moves out of the receptacle 11 in the direction of the open position P2 of the lock arrangement 10 according to arrow PF7, as shown in FIG. 19. The lock arrangement 10 is now open.

Figure 20:
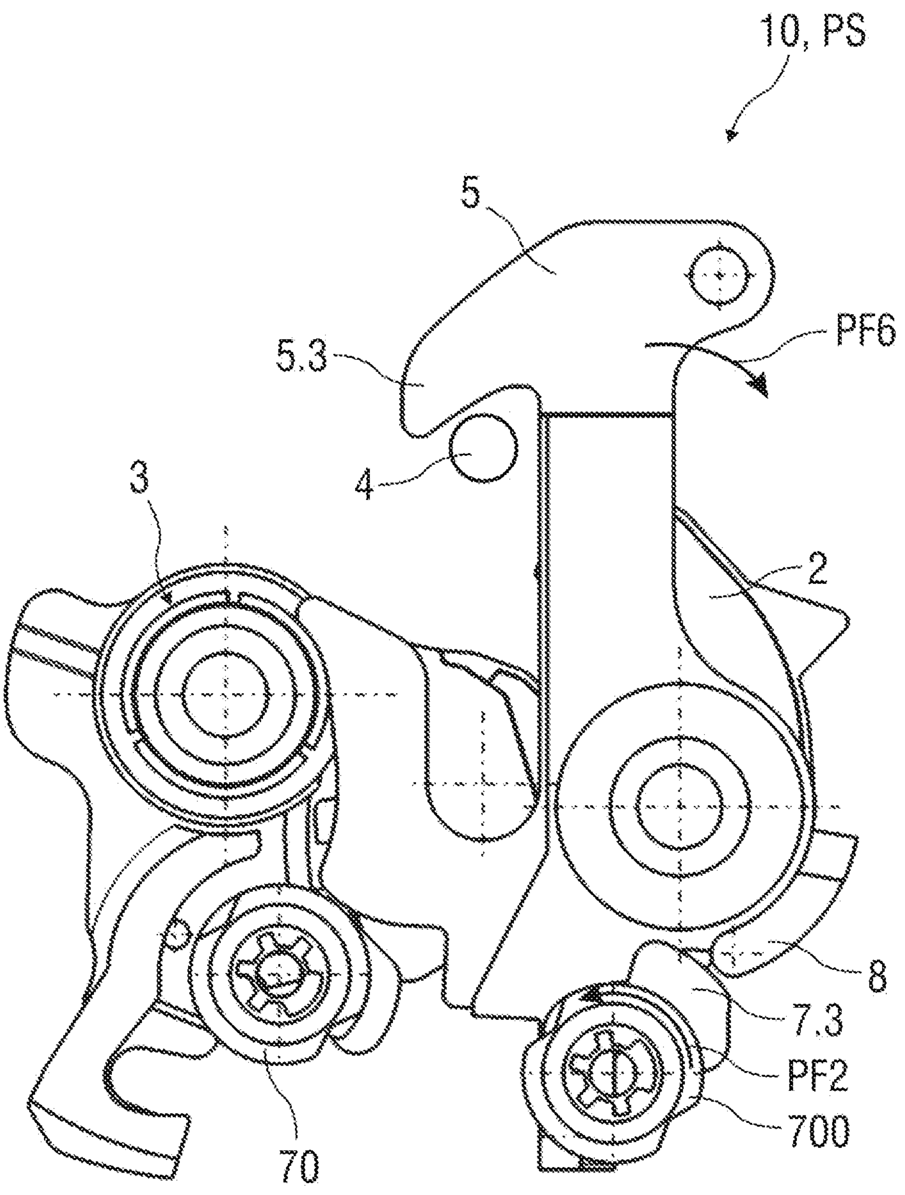
FIG. 20 shows a schematic view of a mechanical emergency unlocking for a lock arrangement, in particular for a luggage compartment lid.

FIG. 20 shows an example of a luggage compartment locking means, in particular a mechanical emergency unlocking of the lock arrangement 10, for example for a luggage compartment. For example, the secured position PS must be locked if there is a vehicle speed of more than 5 km/h.

For example, a lever (not shown) is pulled for the lock arrangement 10 of the luggage compartment locking, wherein the lever can be braked by dampers.

The actuating drive 6 for the second cam 700 is rotated counterclockwise according to arrow PF2, so that the security element 5 is locked by means of the second cam 700, in particular the locking cam 7.3. In this case, the locking cam 7.3 comes into engagement with the blocking element 8 on the security element 5, as a result of which it is locked against unlocking according to arrow PF6.

The actuating drive 6 can stop for a few seconds and then rotates back to the right and takes the second cam 700 into the starting position.

LIST OF REFERENCE SIGNS

- 1, 10 lock arrangement
- 1.1 locking module
- 1.2 drive module
- 2 rotary catch
- 2.1 claw
- 2.2 fastening rivet
- 3 locking mechanism
- 3.1 pawl
- 3.2 bearing pin

3.3 extension
3.4 axis of rotation
3.5 pawl counter contour
4 locking element
5 security element
5.1 claw-shaped hook
5.2 axis of rotation
5.3 securing hook
5.4 driving contour
5.5 counter contour
6 actuating drive
6.1 servomotor
6.2 spindle drive
6.2.1 spindle
6.2.2 thread
6.3 transmission
6.3.1 wheel segment
6.3.2 external toothing
6.3.3 toothed wheel
6.4 axis of rotation
6.5 drive pin
7, 70, 700 cams
7.01 first surface
7.02 second surface
7.1 cam contour
7.1.1 first locking contour
7.1.2 second locking contour
7.2.1 first locking region
7.2.2 second locking region
7.2.3 third locking region
7.3 locking cam
7.4 driving region
8 blocking element
9 bearing pin
11 receptacle
12 mechanism
P1 closed position of the lock arrangement
PS secured position of the lock arrangement
P2 open position of the lock arrangement
PF1 . . . PF7 arrow
R1, R2 actuation directions

The invention claimed is:

1. A lock arrangement for an engine hood or a tailgate of a vehicle, comprising:

a rotary catch for a locking element, wherein the rotary catch and the locking element are coupled in locking fashion in a closed position of the lock arrangement, a security element for securing the locking element in a secured position of the lock arrangement, a cam for unlocking and locking, and at least one actuating drive which is designed as a two-way actuating drive and which interacts with the cam, wherein the cam is formed in such a way that it is actuated, during a first actuation of the actuating drive, both in one step and in separate steps and in different sequences, wherein said cam has a single radial extension with first and second contours, wherein the first contour is configured to unlock the rotary catch and lock the security element, and conversely, the second contour having a different radial extension than the first contour is configured to lock the security element and unlock the rotary catch.

2. The lock arrangement according to claim 1, wherein the cam contours are each formed as one of an opening surface or as a locking surface.

3. The lock arrangement according to claim 2, wherein the opening surface during the first actuation enters directly or indirectly into engagement with the rotary catch for unlocking and opening the rotary catch, and the locking surface enters directly or indirectly into engagement with the security element in order to lock it.

4. The lock arrangement according to claim 1, wherein the actuating drive and/or the cam can be actuated during the first actuation in a first actuation direction and can be actuated in a second actuation in an actuation direction opposite the first actuation direction.

5. The lock arrangement according to claim 1, wherein, during the first actuation of the actuating drive, the cam unlocks the rotary catch and the rotary catch automatically passes from a locked position into a free position, wherein the rotary catch releases the locking element and the locking element passes into the secured position, in which the security element secures the locking element.

6. The lock arrangement according to claim 1, wherein the cam is designed such that, during a second actuation or during a second actuation of the actuating drive, both in one step and in separate steps, the cam unlocks the security element and opens the locking element.

7. The lock arrangement according to claim 6, wherein during the second actuation of the actuating drive, the cam unlocks the security element and the security element releases the locking element and the locking element passes into the open position of the lock arrangement.

8. The lock arrangement according to claim 1, wherein a locking mechanism is provided for locking the rotary catch in the closed position of the lock arrangement.

9. The lock arrangement according to claim 8, wherein the locking mechanism is designed as a pawl.

10. The lock arrangement according to claim 9, wherein the actuating drive and the cam are movement-coupled to the locking mechanism for unlocking the rotary catch.

11. The lock arrangement according to claim 1, wherein the actuating drive is designed as a servomotor which interacts with a spindle drive and a transmission.

* * * * *